US012806948B2

(12) United States Patent
Pollock et al.

(10) Patent No.: US 12,806,948 B2
(45) Date of Patent: Nov. 24, 2026

(54) VEHICLE FRAME SYSTEM FOR A VEHICLE

(71) Applicant: Transportation IP Holdings, LLC, Norwalk, CT (US)

(72) Inventors: Jarred Michael Pollock, Berwick, PA (US); Shane Michael Moran, Paxinos, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 598 days.

(21) Appl. No.: 18/456,332

(22) Filed: Aug. 25, 2023

(65) Prior Publication Data

US 2023/0398825 A1 Dec. 14, 2023

Related U.S. Application Data

(63) Continuation-in-part of application No. 17/731,394, filed on Apr. 28, 2022, now Pat. No. 12,539,724.

(60) Provisional application No. 63/185,183, filed on May 6, 2021.

(51) Int. Cl.
*B60F 1/00* (2006.01)
*B60F 1/04* (2006.01)

(52) U.S. Cl.
CPC .................. *B60F 1/00* (2013.01); *B60F 1/04* (2013.01); *B60F 1/043* (2013.01)

(58) Field of Classification Search
CPC ...... B60F 1/00; B60F 1/02; B60F 1/04; B60F 1/043; B60F 2301/04
See application file for complete search history.

(56) References Cited

U.S. PATENT DOCUMENTS 3,980,025 A * 9/1976 Olson, Sr. ............... B60F 1/043 105/72.2
4,534,297 A * 8/1985 Johnson, Sr. .......... B61D 15/00 105/72.2
6,298,792 B1 * 10/2001 Jackson, Jr. ............ B60F 1/043 105/215.1
6,352,035 B1 * 3/2002 Kashiwase .............. B60F 1/043 105/215.1
10,427,697 B2 * 10/2019 Bramlett ............... B61C 11/005
(Continued)

FOREIGN PATENT DOCUMENTS

CN 202911485 U * 5/2013
CN 202944164 U * 5/2013
(Continued)

*Primary Examiner* — Cheng Lin
(74) *Attorney, Agent, or Firm* — K&L Gates LLP

(57) ABSTRACT

A vehicle frame assembly includes a frame bar extending between first and second ends along a first axis. The first end is coupled with a first guide assembly, and the second end of the frame bar is coupled with a second guide assembly. First and second housings are coupled with a frame of a vehicle system. A first actuator system extends between the first housing and the frame bar, and a second actuator system is extends between the second housing and the frame bar. The first and second actuator systems control rotational movement of the frame bar between first and second directions of rotation. Rotating the frame bar in the first direction of rotation moves an axle away from a route, and rotating the frame bar in the second direction of rotation moves the axle toward the route.

20 Claims, 16 Drawing Sheets

(56) References Cited

U.S. PATENT DOCUMENTS

| | | | | |
|---|---|---|---|---|
| 10,625,548 | B2 * | 4/2020 | Aube | B61D 15/00 |
| 10,773,562 | B2 * | 9/2020 | Mascola | B60F 1/04 |
| 12,275,284 | B2 * | 4/2025 | Dwyer | B60F 1/04 |
| 2017/0151847 | A1 * | 6/2017 | Letukas | B60F 1/04 |
| 2018/0370309 | A1 * | 12/2018 | Hazrati-Ashtiani | B60F 1/02 |
| 2021/0061035 | A1 * | 3/2021 | Monroe | B61D 15/00 |
| 2021/0086574 | A1 * | 3/2021 | Monroe | B60F 1/043 |
| 2022/0355635 | A1 | 11/2022 | Pollock | |

FOREIGN PATENT DOCUMENTS

| | | | | | |
|---|---|---|---|---|---|
| CN | 108032691 | A | * | 5/2018 | B60F 1/00 |
| CN | 109455046 | A | * | 3/2019 | B60F 1/005 |
| FR | 2838675 | A1 | * | 10/2003 | B60F 1/046 |

* cited by examiner

VEHICLE FRAME SYSTEM FOR A VEHICLE

CROSS-REFERENCE TO RELATED APPLICATIONS

This application is a continuation-in-part of U.S. patent application Ser. No. 17/731,394, which was filed on 28 Apr. 2022, which claims priority to U.S. Provisional Application No. 63/185,183, which was filed on 6 May 2021. The entire disclosures of which are incorporated herein by reference.

BACKGROUND

Technical Field

The subject matter described herein relates to railgear frame systems of hi-rail vehicles and related methods.

Discussion of Art

A railgear system may be coupled with a conventional roadway vehicle to allow the roadway vehicle to traverse either a railway track or a non-rail route. For example, the railgear allows the vehicle to convert between road use and rail use. Current railgear systems may be manufactured of steel components, and may be used with light or heavy duty hi-rail vehicles, such as passenger vehicles, mining vehicles, buses, agricultural equipment, heavy haul vehicles, or other off-highway vehicles.

However, the weight of the railgear system that is added to the vehicle reduces a payload that the vehicle may carry or operate with. For example, a light duty vehicle that includes a railgear system may be limited in a remaining payload that the vehicle may carry before the vehicle is overloaded. Furthermore, railgear systems are traditionally manufactured of steel or steel alloys and therefore have an additional payload that requires an amount of torque to rotate frame bars of the railgear systems. Conventional rail gear systems may use a single hydraulic cylinder that can supply a sufficient amount of torque to the frame bar to control movement of the railgear system. Hydraulic cylinders, however, require the use of several additional components to function (e.g., pumps, manifolds, hydraulic hoses, etc.) and require power from a vehicle battery.

It may be desirable to have a railgear system and method that differs from those currently available.

BRIEF DESCRIPTION

In accordance with one example or aspect, a vehicle frame system includes a lower cross frame assembly that is coupled with an axle and includes a frame bar extending between a first end and a second end along a first axis. The frame bar includes a first external circumferential surface extending along at least a portion of the first axis. A first sleeve is configured to be disposed over the first external circumferential surface. A first internal surface of the first sleeve is operably coupled with the first external circumferential surface of the frame bar. The first sleeve is configured for a temperature of the first sleeve to be controlled to change one or more characteristics of the first sleeve. The first sleeve is prohibited from moving relative to the frame bar responsive to changing the one or more characteristics of the first sleeve.

In accordance with one example or aspect, a vehicle frame system includes an axle extending between a first end and a second end, a first guide wheel operably coupled with the first end of the axle, and a second guide wheel operably coupled with the second end of the axle. A lower cross frame assembly is operably coupled with the axle and includes a frame bar extending between a first end and a second end of the frame bar along a first axis. A first sleeve and a second sleeve are respectively disposed over the first end and the second end of the frame bar. A first guide assembly is operably coupled with the first end of the frame bar and a second guide assembly is operably coupled with the second end of the frame bar. Each of the first and second guide assemblies respectively comprises a guide tube extending between a first end and a second end along a second axis, and a third sleeve disposed within a portion of the guide tube. The first and second sleeves are interference fit with the frame bar and the third sleeve is interference fit within the guide tube so that the first and second sleeves are prohibited from moving relative to the frame bar and the third sleeve is prohibited from moving relative to the guide tube.

In accordance with one example or aspect, a railgear for a hi-rail vehicle includes an axle extending between a first end and a second end. A first guide wheel is operably coupled with the first end of the axle, and a second guide wheel is operably coupled with the second end of the axle. A lower cross frame assembly is operably coupled with the axle and includes a frame bar extending between a first end and a second end along a first axis. A first sleeve is disposed over the first end of the frame bar and a second sleeve is disposed over the second end of the frame bar. An actuator device is operably coupled with the lower cross frame assembly and controls movement of the axle between different states of the axle relative to the lower cross frame assembly. The railgear includes first and second guide assemblies operably coupled with the first and second ends of the frame bar. Each of the first and second guide assemblies respectively comprises a guide tube extending between a first end and a second end along a second axis, and a third sleeve disposed within a portion of the guide tube. The first sleeve and the second sleeve are interference fit on to the first and second ends of the frame bar, respectively, and the third sleeve of each of the first and second guide assemblies is interference fit within the guide tube, so that the first and second sleeves and the third sleeve are prohibited from moving relative to the frame bar and the guide tube, respectively.

In accordance with one example or aspect, a vehicle frame assembly includes a frame bar extending between a first end and a second end along a first axis. The first end of the frame bar is operably coupled with a first guide assembly extending between the first end of the frame bar and a third end of an axle, and the second end of the frame bar is operably coupled with a second guide assembly extending between the second end of the frame bar and a fourth end of the axle. A first housing is operably coupled with a frame of a vehicle system, and a second housing is operably coupled with the frame of the vehicle system. A first actuator system is operably coupled with and extends between the first housing and the frame bar at a first location of the frame bar along the first axis, and a second actuator system is operably coupled with and extends between the second housing and the frame bar at a second location of the frame bar along the first axis. The first actuator system and the second actuator system control rotational movement of the frame bar between a first direction of rotation and a second direction of rotation. Rotating the frame bar in the first direction of rotation moves the axle away from a route along which the vehicle system is configured to move, and rotating the frame bar in the second direction of rotation moves the axle toward the route.

In accordance with one example or aspect, a hi-rail vehicle system includes a hi-rail vehicle having a frame extending between a first end and a second end. The hi-rail vehicle system includes a first vehicle frame assembly operably coupled with the frame proximate the first end of the frame. The first vehicle frame assembly includes a first frame bar that extends between a third end and a fourth end along a first axis. The first vehicle frame assembly includes first and second actuator systems operably coupled with the first frame bar and control rotational movement of the first frame bar. The hi-rail vehicle system also includes a second vehicle frame assembly that is operably coupled with the frame of the hi-rail vehicle proximate the second end of the frame. The second vehicle frame assembly includes a second frame bar that extends between a fifth end and a sixth end along a second axis. The second vehicle frame assembly includes third and fourth actuator systems that are operably coupled with the second frame bar and control rotational movement of the second frame bar. The first and second actuator systems rotate the first frame bar in a first direction of rotation or a second direction of rotation to change a state of a first axle operably coupled with the first frame bar, and the third and fourth actuator systems rotate the second frame bar in the first direction of rotation or the second direction of rotation to change a state of a second axle operably coupled with the second frame bar.

In accordance with one example or aspect, a rail-gear for a hi-rail vehicle includes a frame bar extending between a first end and a second end along a first axis. The first end of the frame bar is operably coupled with the first guide assembly extending between the first end of the frame bar and a third end of an axle. The second end of the frame bar is operably coupled with a second guide assembly extending between the second end of the frame bar and a fourth end of the axle. A first housing is operably coupled with a frame of a hi rail vehicle, and a first electric actuator system is operably coupled with the first housing and the frame bar. A second housing is operably coupled with the frame of the hi-rail vehicle and a second electric actuator system is operably coupled with the second housing and the frame bar. The first and second electric actuator systems receive electric power from the hi-rail vehicle. The first and second electric actuator systems control rotational movement of the frame bar between a first direction of rotation and a second direction of rotation about the first axis. Rotating the frame bar in the first direction of rotation moves the axle away from a route along which the hi-rail vehicle is configured to move, and rotating the frame bar in the second direction of rotation moves the axle toward the route.

In accordance with one example or aspect, a vehicle frame assembly includes a frame bar extending between a first end and a second end along a first axis. The first end of the frame bar is operably coupled with a first guide assembly extending between the first end of the frame bar and a third end of an axle. The second end of the frame bar is operably coupled with a second guide assembly extending between the second end of the frame bar and a fourth end of the axle. A first housing is operably coupled with a frame of a vehicle system, and a second housing is operably coupled with the frame of the vehicle system A first actuator system is operably coupled with and extends between the first housing and the frame bar at a first location of the frame bar along the first axis, and a second actuator system is operably coupled with and extends between the second housing and the frame bar at a second location of the frame bar along the first axis. The first actuator system and the second actuator system control rotational movement of the frame bar between a first direction of rotation and a second direction of rotation. Rotating the frame bar in the first direction of rotation moves the axle away from a route along which the vehicle system moves, and rotating the frame bar in the second direction of rotation moves the axle towards the route.

In accordance with one example or aspect, a hi-rail vehicle system includes a hi-rail vehicle that includes a frame extending between a first end and a second end. A first vehicle frame assembly is operably coupled with the frame of the hi-rail vehicle proximate the first end of the frame. The first vehicle frame assembly includes a first frame bar extending between a third end and a fourth end along a first axis. The first vehicle frame assembly includes first and second actuator systems configured to be operably coupled with the first frame bar and control rotational movement of the first frame bar. A second vehicle frame assembly is operably coupled with the frame of the hi-rail vehicle proximate the second end of the frame. The second vehicle frame assembly includes a second frame bar extending between a fifth end and a sixth end along a second axis. The second vehicle frame assembly includes third and fourth actuator systems that are operably coupled with the second frame bar and control rotational movement of the second frame bar. The first and second actuator systems rotate the first frame bar in a first direction of rotation or a second direction of rotation to change a state of a first axle operably coupled with the first frame bar. The third and fourth actuator systems rotate the second frame bar in the first direction of rotation or the second direction of rotation to change a state of a second axle operably coupled with the second frame bar.

In accordance with one example or aspect, a rail-gear for a hi-rail vehicle includes a frame bar extending between a first end and a second end along a first axis. The first end of the frame bar is operably coupled with a first guide assembly extending between the first end of the frame bar and a third end of an axle. The second end of the frame bar is operably coupled with a second guide assembly extending between the second end of the frame bar and a fourth end of the axle. A first housing is operably coupled with a frame of a hi-rail vehicle, and a first electric actuator system is operably coupled with the first housing and the frame bar. A second housing is operably coupled with the frame of the hi-rail vehicle, and a second electric actuator system is operably coupled with the second housing and the frame bar. The first and second electric actuator systems receive electric power from the hi-rail vehicle. The first and second electric actuator systems control rotational movement of the frame bar between a first direction of rotation and a second direction of rotation about the first axis. Rotating the frame bar in the first direction of rotation moves the axle away from a route along which the hi-rail vehicle moves, and rotating the frame bar in the second direction of rotation moves the axle toward the route.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
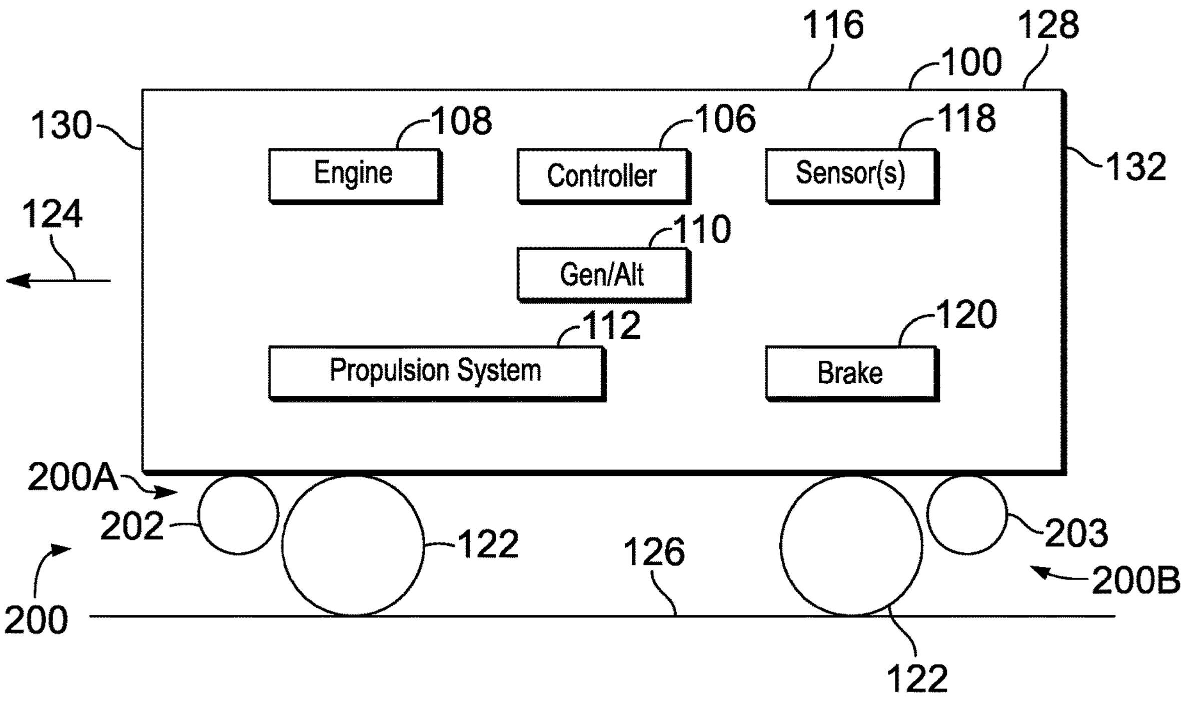
FIG. 1 illustrates one example of a hybrid vehicle system in accordance with one embodiment.

Embodiments of the subject matter described herein relate to a vehicle frame system and method of operation. The vehicle frame system includes one or more axles that extend between a first end and a second end, with a first guide wheel attached to the first end of each axle, and a second guide wheel attached to the second end of each axle. The axle(s) may be operably coupled with a lower cross frame assembly that includes a frame bar extending between first and second ends along a first axis. A first sleeve and a second sleeve are disposed over the first end and the second end of the frame bar, respectively. The frame bar and the first and second sleeves may be manufactured of the same (or similar) or different materials. For example, the frame bar may be manufactured of an aluminum alloy, and the first and second sleeves may be manufactured of a steel alloy. Optionally, the frame bar and/or the sleeves may be manufactured of a magnesium alloy, a titanium alloy, a plastic material, a zinc alloy, a brass alloy, a bronze alloy, a tin alloy, an engineered material, or the like. In one or more embodiments, the frame bar and the sleeves may be made from metal alloys, but the metal alloy of the frame bar may be lighter in weight than the metal alloy of the sleeves.

The sleeves may be disposed at positions along the length of the frame bar that interfere with other components that may be manufactured of a material other than aluminum. For example, the sleeves may be manufactured of similar materials to the other components, and may be used to control an amount of wear between the dissimilar materials of the frame bar (e.g., the aluminum alloy) and the other component (e.g., non-aluminum material).

The vehicle frame system also includes a first guide assembly coupled with the first end of the frame bar, and a second guide assembly coupled with the second end of the frame bar. Each of the first and second guide assemblies includes a guide tube extending along a second axis, and a third sleeve disposed within a portion of the guide tube. The guide tubes and the third sleeves may be manufactured of different materials. For example, the guide tubes may be manufactured of an aluminum alloy, and the third sleeves may be manufactured of a steel alloy. Optionally, the guide tubes may be manufactured of a magnesium alloy, a titanium alloy, an engineered material, a plastic material, or the like, and the third sleeves may be manufactured of a zinc alloy, a brass alloy, a bronze alloy, a tin alloy, an engineered material, or the like. In one or more embodiments, the guide tubes and the third sleeves may be made from metal alloys, but the metal alloy of the guide tubes may be lighter in weight than the metal alloy of the third sleeves. The third sleeves may be disposed at positions within the guide tubes that interfere with or are in contact with another component that may be manufactured of a material other than aluminum. For example, the third sleeves may be manufactured of similar materials to the other components, and may be used to control an amount of wear between the dissimilar materials of the guide tubes (e.g., the aluminum alloy) and the other component (e.g., non-aluminum material).

The first and second sleeves can be interference fit with the frame bar and the third sleeve can be interference fit within the guide tube so that the first and second sleeves are prohibited from moving relative to the frame bar, and the third sleeve is prohibited from moving relative to the guide tube. In order to assemble the sleeves with the frame bar and with the guide tubes, respectively, a temperature of the sleeves may be controlled to change one or more characteristics of the sleeves. For example, the temperature of the sleeves may be increased to change the characteristics of the material of the sleeves to allow or enable the sleeves to be moved to assembled positions, and the temperature of the sleeves may be subsequently decreased to again change the characteristics of the sleeves to produce the interference fit between the sleeves and the frame bar and guide tubes, respectively. For example, the interference fit of the sleeves with the frame bar and the guide tubes may be temperature shrink fits that are created by heating the sleeves to increase the sizes of the sleeves such that the sleeves can be placed onto the frame bar, or decrease the sizes of the sleeves such that the sleeves can be placed into the guide tubes. The sleeves then may be cooled to shrink or expand the sleeves and form the interference fits. In one embodiment, the frame bar cannot fit inside the sleeves and the sleeves cannot fit inside the guide tubes without first heating and changing the characteristics of the sleeves. The interference fits between the sleeves and the frame bar and guide tubes prohibit the sleeves from moving relative to the frame bar and guide tubes, respectively.

In one or more embodiments, the vehicle frame system may be referred to as a railgear, railgear system, railgear guide assembly, or the like. The vehicle frame system may be installed onto or operably coupled with a conventional roadway vehicle to enable the vehicle to traverse either a railway track or a non-rail route. For example, the railgear vehicle frame system allows the vehicle to convert between road use and rail use. In one or more embodiments, the vehicle frame system may include a front railgear unit that may be disposed at a front end of the vehicle, and a rear railgear unit that may be disposed at a rear end of the vehicle. Each of the front and rear railgear units may include one or more actuator devices (e.g., hydraulic cylinder, electric actuators, or the like) that may control positioning of each of the front and rear railgear units between different states. The vehicle system may move along rails of the railway track when the vehicle frame system (e.g., the front and rear railgear units) is in a first state, and the vehicle system may move along the non-railway route when the vehicle frame system (e.g., the front and rear railgear units) is in a second state. In one or more embodiments, the vehicle system may be referred to as a hybrid vehicle system, a hi-rail vehicle, or the like. The vehicle frame system may include components that are manufactured of different materials to control a weight of the vehicle frame system. For example, some components of the vehicle frame system may be manufactured of steel alloys, and other components may be manufactured of aluminum alloys. Optionally, one or more components may be manufactured of any other metallic alloys, engineered materials, plastics, or the like.

FIG. 1 illustrates a vehicle system 100 in accordance with one embodiment. The vehicle system may be a car, or other passenger vehicle, a mining vehicle, a bus, agricultural equipment, a heavy haul vehicle, or another off-highway vehicle. In one or more embodiments, the vehicle system may be a hi-rail vehicle system that includes a hi-rail vehicle 116 having a frame 128 that extends between a first end 130 and a second end 132.

The vehicle system includes a controller 106 that represents hardware circuitry having and/or connected with one or more processors, such as one or more microprocessors, field programmable gate arrays, integrated circuits, and/or the like. In one embodiment, the controller can represent an engine control unit. The controller communicates with an engine 108 of the vehicle system. The engine can be a fuel-consuming engine, such as a diesel engine. Not all embodiments of the inventive subject matter, however, are limited to diesel engines. The engine can represent another type of engine that consumes fuel other than diesel fuel.

The engine consumes fuel to perform work, such as rotating a shaft joined to a generator or alternator 110 ("Gen/Alt" in FIG. 1), which causes the generator or alternator to output electric current. This current can be stored or provided to one or more powered components of the vehicle system, such as propulsion system 112 and/or an auxiliary system (not shown). The propulsion system can represent one or more motors that propel the powered system (e.g., traction motors) using electric current output by the generator or alternator. The propulsion system may include plural wheels 122 that are controlled by the propulsion system to move the vehicle system along a route 126 in a direction of movement 124 of the vehicle system. In the side view illustrated embodiment of FIG. 1, two wheels are illustrated, and are operably coupled with two corresponding wheels disposed on the other side of the vehicle system. The vehicle system may include a brake 120 or brake system that may be controlled to control movement of the vehicle system to slow or stop movement of the vehicle system. The brake can include air brakes, friction brakes, motors (e.g., used for dynamic and/or regenerative braking), or the like.

The auxiliary system can represent one or more other loads that consume at least some of this current, but not for propulsion of the powered system. For example, the auxiliary system can represent motors (e.g., hydraulic and/or linear motors that control movement of a vehicle frame system), fans (e.g., blowers that cool parts of the propulsion system, blowers that cool braking resistors, pumps that force coolant to cool the engine or other components, etc.), heating and/or cooling systems that heat or cool an operator cab of the vehicle system, or the like.

One or more sensors 118 of the vehicle system may sense characteristics of operation of the vehicle system and/or environment, and output signals (e.g., wireless signals and/or signals that are conducted via one or more conductive pathways such as wires, cables, buses, etc.). Optionally, the one or more sensors may sense characteristics of various systems of the vehicle system, such as positions of hydraulic and/or linear motors of the auxiliary system, characteristics and/or changes in characteristics of the route along which the vehicle system is moving, or the like. As described herein, the controller may receive these characteristics to monitor the operation and/or environment of the vehicle system. using this information, the controller can automatically change one or more operations of the vehicle system, such as, but not limited to, an operating speed of the engine, a brake settings, or the like. The number of each of the components shown in FIG. 1 is used as one example. For example, multiples of the engine, the controller, the sensor(s), the generator, the alternator, and/or the propulsion system may be provided.

The vehicle system includes one or more vehicle frame systems 200. In the illustrated embodiment of FIG. 1, a first vehicle frame system 200A includes a first guide wheel 202 disposed on a first side or a first end of an axle (e.g., a front axle of the vehicle system, not shown). Additionally, the first vehicle frame system includes a second guide wheel (not shown) disposed on a second side or second end of the axle (e.g., that is opposite the first guide wheel 202). A second vehicle frame system 200B includes a third guide wheel 203 on the first side or first end of another axle (e.g., a rear axle of the vehicle system, not shown), and a fourth guide wheel (not shown) that is disposed on a second side of the rear axle. The one or more vehicle frame systems are configured to move to different states in one or more directions relative to the vehicle system. Movement of the vehicle frame systems include at least movement of the first and second guide wheels toward or away from the route. The guide wheels may move toward the route to contact the route when the hybrid vehicle system is configured to operate as a rail vehicle. Alternatively, the guide wheels may move away from the route when the hybrid vehicle system is configured to operate as a non-rail vehicle. For example, axles of the one or more vehicle frame systems may move between a first state such that the vehicle system can operate as a rail vehicle and the guide wheels are in contact with the route, and a second state such that the vehicle system can operate as a non-rail vehicle and the first and second guide wheels are not in contact with the route (as illustrated in FIG. 1).

In the illustrated embodiment of FIG. 1, the vehicle system includes the first vehicle frame system (e.g., the front railgear unit) disposed at a first location of the vehicle system and the second vehicle frame system (e.g., the rear railgear unit) disposed at another location of the vehicle system. For example, the first vehicle frame system may provide the first and second guide wheels disposed at a front portion of the vehicle system in the direction of movement of the vehicle system, and the second vehicle frame system may provide third and fourth guide wheels disposed at or proximate a rear portion of the vehicle system. Optionally, the first and second vehicle frame systems may be disposed at any location between a front end and a rear end of the vehicle system. For example, the illustrated embodiment of FIG. 1 indicates the first vehicle frame system disposed between front wheels of the vehicle system and the front end of the vehicle system (e.g., in the direction of movement of the vehicle system) and the second vehicle frame system disposed between rear wheels of the vehicle system and the rear end of the vehicle system (e.g., in the direction of movement of the vehicle system). Additionally or alternatively, one of the vehicle frame systems may be disposed at a location between the front and rear wheels of the vehicle system. Optionally, the vehicle system may include only a single vehicle frame system that may be disposed proximate a front end or a rear end of the vehicle system.

Figure 2:
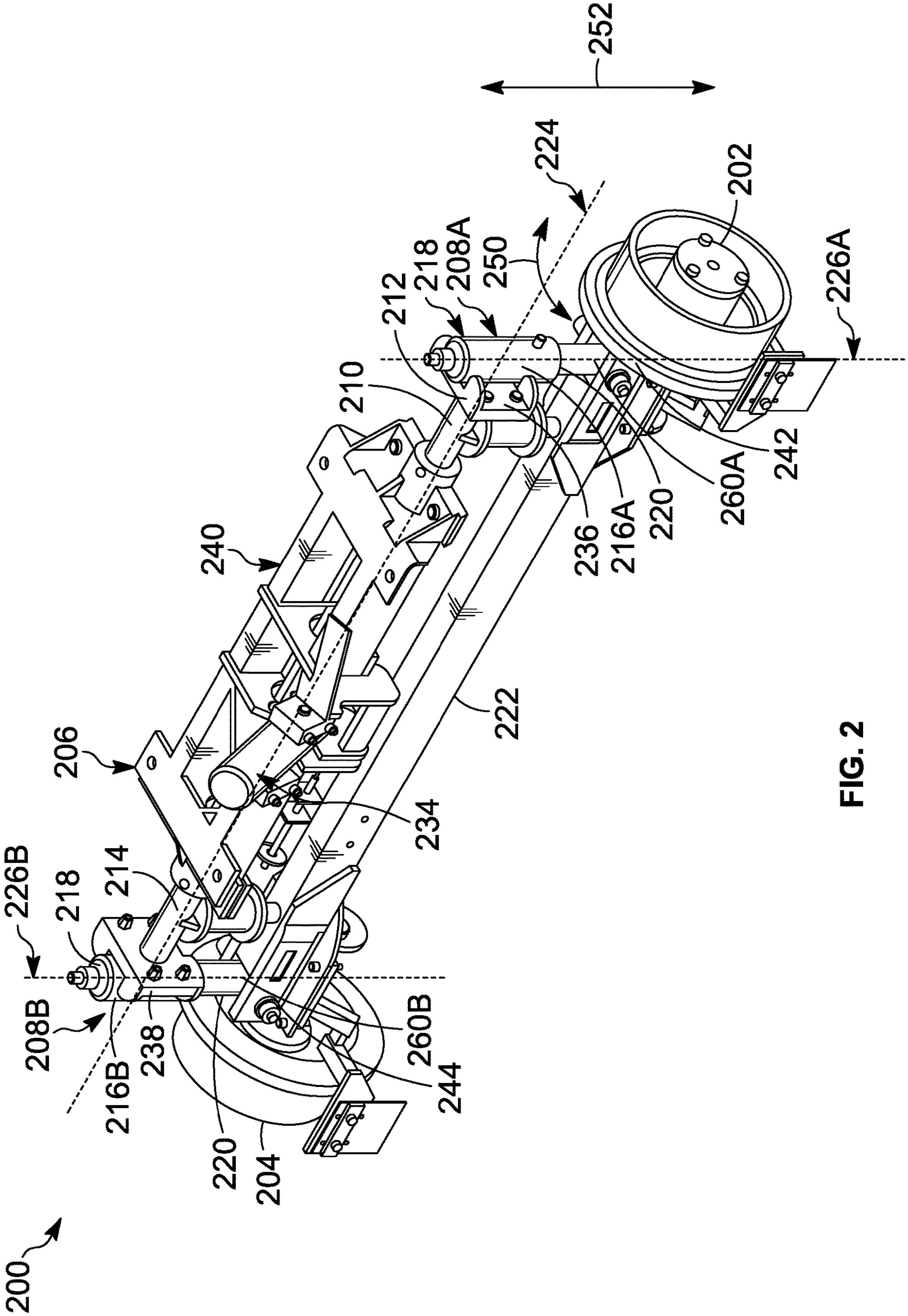
FIG. 2 illustrates a perspective view of a vehicle frame system of the hybrid vehicle system illustrated in FIG. 1.
Figure 3:
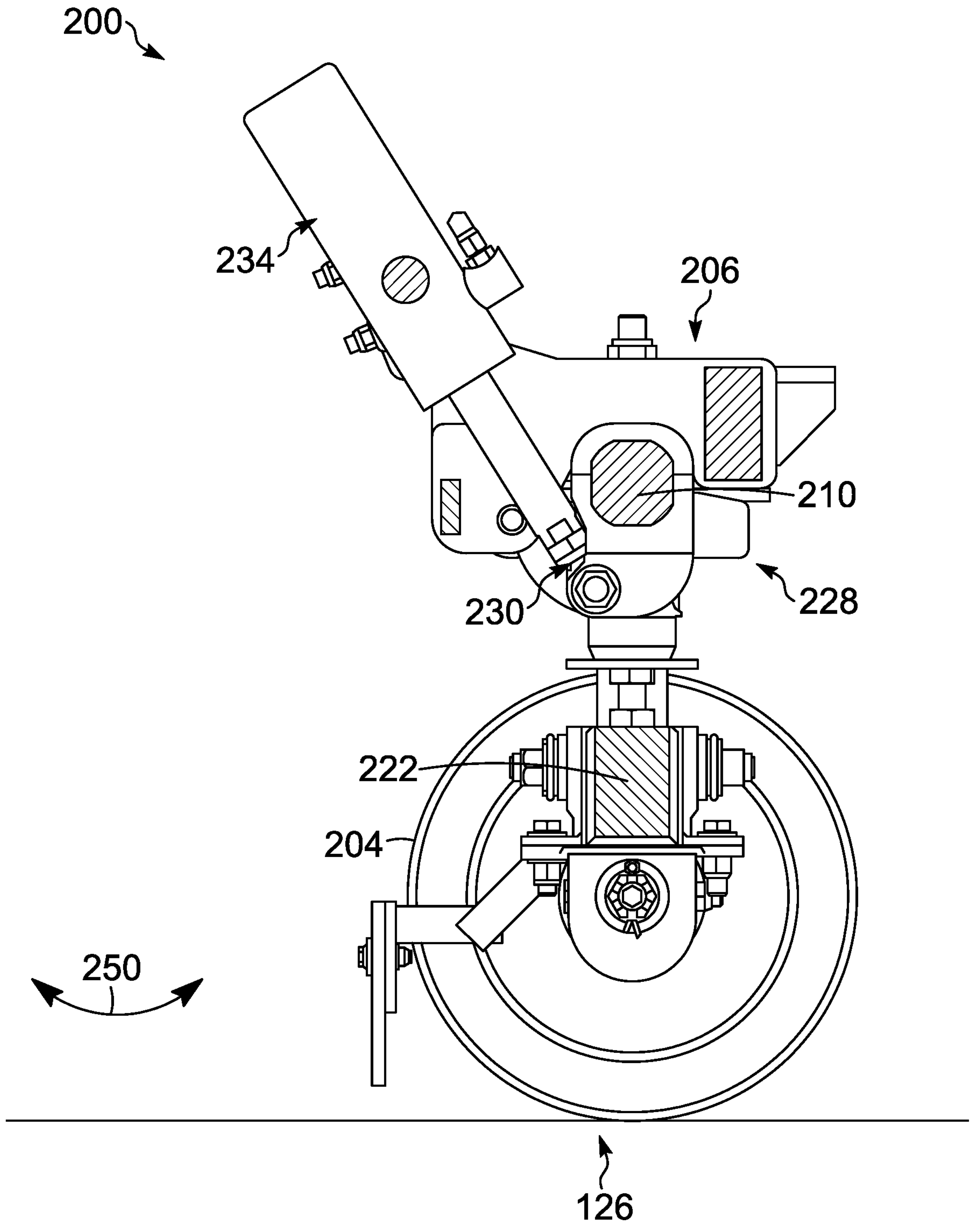
FIG. 3 illustrates a section view of the vehicle frame system shown in FIG. 2.

FIG. 2 illustrates a perspective view of the vehicle frame system 200 in accordance with one embodiment. FIG. 3 illustrates a section view of the vehicle frame system shown in FIG. 2 in accordance with one embodiment. The vehicle frame system illustrated in FIGS. 2 and 3 may represent a front railgear unit and/or a rear railgear unit. The vehicle frame system includes an axle 222 that extends between a first end 242 and a second end 244. The first guide wheel 202 is operably coupled with the first end of the axle, and the second guide wheel 204 is operably coupled with the second end of the axle.

The vehicle frame system includes an upper cross frame assembly 206 and a lower cross frame assembly 228. A bottom surface of the upper cross frame assembly faces toward and may be operably coupled with a top surface of the lower cross frame assembly. The upper cross frame assembly includes a frame mounting device 240 that is used to operably couple the vehicle frame system with a frame of a vehicle system (not shown). For example, the frame mounting device may couple the vehicle frame system with a bottom side of the vehicle system, or alternatively with another side or surface of the frame of the vehicle system. In the illustrated embodiment, the frame mounting device includes plural mounting holes that may receive fasteners, but alternatively the frame mounting device may be coupled with the frame of the vehicle system by alternative methods such as, but not limited to, welding, or the like.

The lower cross frame assembly includes a frame bar 210 that extends between a first end 212 and a second end 214 along a frame axis or a first axis 224. The lower cross frame assembly includes a first end plate 236 disposed at the first end of the frame bar, and a second end plate 238 disposed at the second end of the frame bar. The first end plate couples the lower cross frame assembly with a first guide assembly 208A, and the second end plate couples the lower cross frame assembly with a second guide assembly 208B. The first and second guide assemblies each include a guide tube 216A, 216B respectively, with each tube extending between first ends 218 and second ends 220 along second axes 226A, 226B, respectively. The guide assemblies also include guide shafts 260A, 260B that extend within a passage of the guide tubes. For example, the guide shaft 260A is disposed within a center passage of the guide tube of the first guide assembly, and the guide shaft 260B is disposed within a center passage of the guide tube of the second guide assembly.

The first guide assembly is operably coupled with the first end of the axle, and the second guide assembly is operably coupled with the second end of the axle. For example, the first and second guide assemblies may move responsive to movement of the axle. In one or more embodiments, the first and second guide assemblies may act or operate as suspensions or suspension guides of the vehicle system. For example, the first and second guide assemblies may provide a spring force to the vehicle system and/or the vehicle frame system. In one or more embodiments, the vehicle frame system may include one or more springs (not shown) or spring devices disposed between the frame bar of the lower cross frame assembly and the axle. For example, the springs or spring devices may provide a spring force between the frame bar and the axle to control movement of the axle relative to the frame bar.

Figure 4:
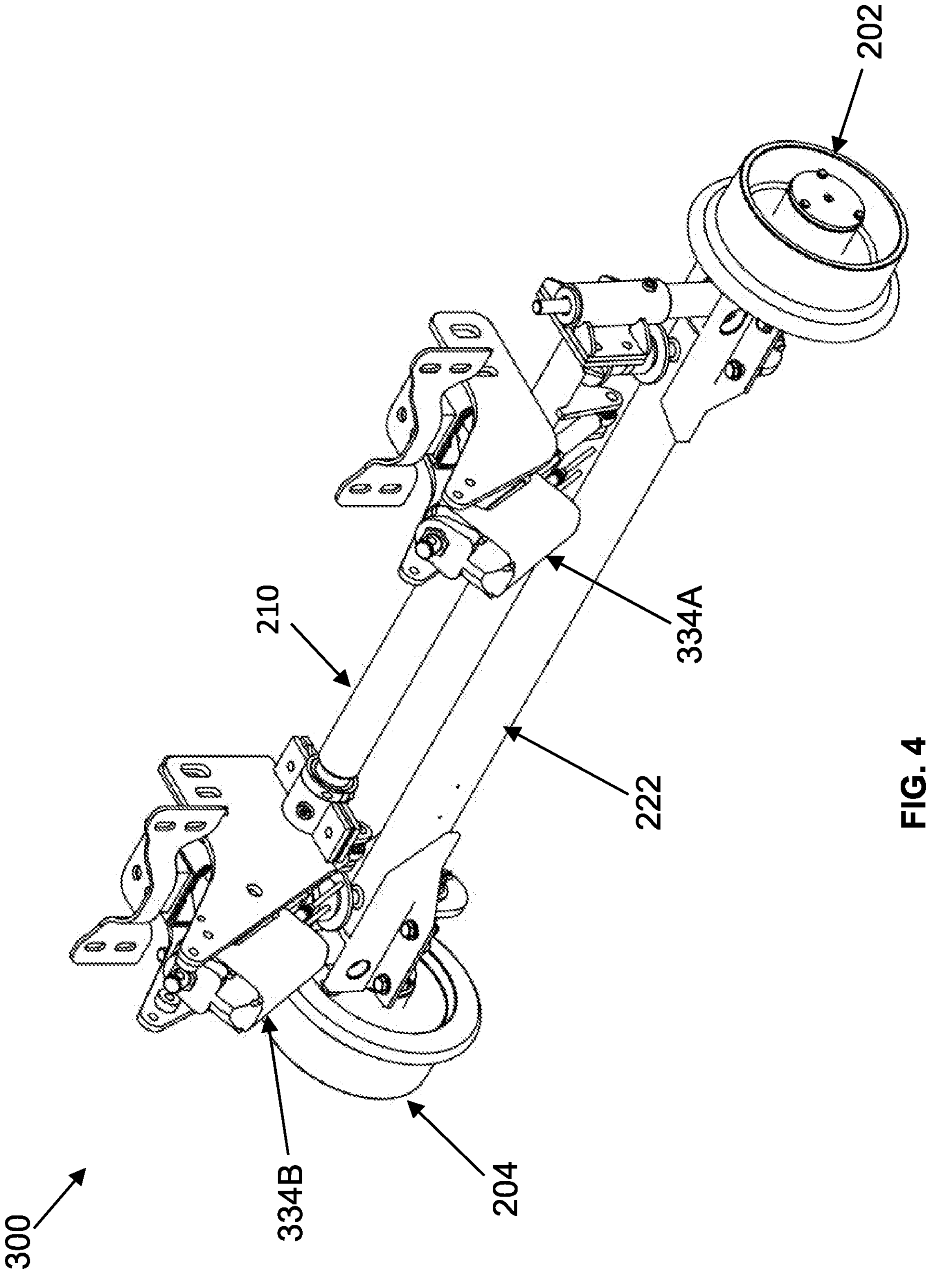
FIG. 4 illustrates a perspective view of a vehicle frame system in accordance with one embodiment.

The vehicle frame system includes at least one actuator device 234. A portion 230 of the actuator device may be operably coupled with the lower cross frame assembly. In the illustrated embodiment, the vehicle frame system includes a single actuator device that is positioned approximately centered between the first and second ends of the frame or first axis. Optionally, the vehicle frame system may include two or more actuator devices, each disposed at a different location between the first and second ends of the frame axis. For example, FIG. 4 illustrates one example of a vehicle frame system 300 in accordance with one embodiment. The vehicle frame system includes the axle 222 that extends between the first and second guide wheels. A first actuator device 334A is coupled with the frame bar 210 proximate to the first guide wheel, and a second actuator device 334B is coupled with the frame bar proximate to the second guide wheel. In one or more embodiments, the first and second actuator devices may be the same devices (e.g., the same type, make, model, or the like), or alternatively may be different devices (e.g., different types, different makes, different models, or the like). In one embodiment, the first and second actuator devices may be specified to generate substantially the same amount of linear force, or alternatively one of the devices may be specified to generate a different amount of linear force or power relative to the other device.

Actuation of the actuator device(s) controls movement of the axle relative to the lower cross frame assembly. For example, actuation of the actuator device moves the axle in a rotational direction 250 (shown in FIG. 2), and rotates the frame bar in the same rotational direction. Rotation of the axle and the frame bar changes a position of the location of the guide wheels. The vehicle frame system may move between different states based on a route along which the vehicle system moves. For example, the actuator device may be controlled to move the guide wheels to one state and toward a position or location away from the route (e.g., such that the guide wheels are not in contact with the route), or the actuator device may be controlled to move the guide wheels to a different state and toward a position or location proximate to the route (e.g., such that the guide wheels are in direct contact with the route).

In one or more embodiments, the actuator device(s) may be a linear actuator device, a hydraulic cylinder actuator device, or the like. The actuator device may be an electric actuator device, such as an electric linear actuator device, and may be controlled via electric energy from the vehicle system. Optionally, the actuator device may include and/or be operably coupled with one or more hydraulic pumps, hoses, a fluid, or the like, to control operation of the actuator device.

In one or more embodiments, the actuator device may include and/or be capable of being coupled with a manual control device, that may allow a user or operator to manually control operation of the one or more actuator devices. As one example, the actuator devices may include a mating component that may be configured to mate with or be coupled with a corresponding mating component of a manual hand crank. The manual hand crank may allow the user or operator to manually control operation of the actuator device, such as in the event of a power failure, mechanical failure (e.g., of the actuator device, of another component of the vehicle frame system, of the vehicle system, or the like), to allow the operator to make adjustments to the positioning of the actuator, or the like. In one embodiment that includes two or more actuator devices, a single manual hand crank may be used to control movement of each actuator device, or a single manual hand crank may control operation of each actuator device (e.g., simultaneously).

Figure 5:
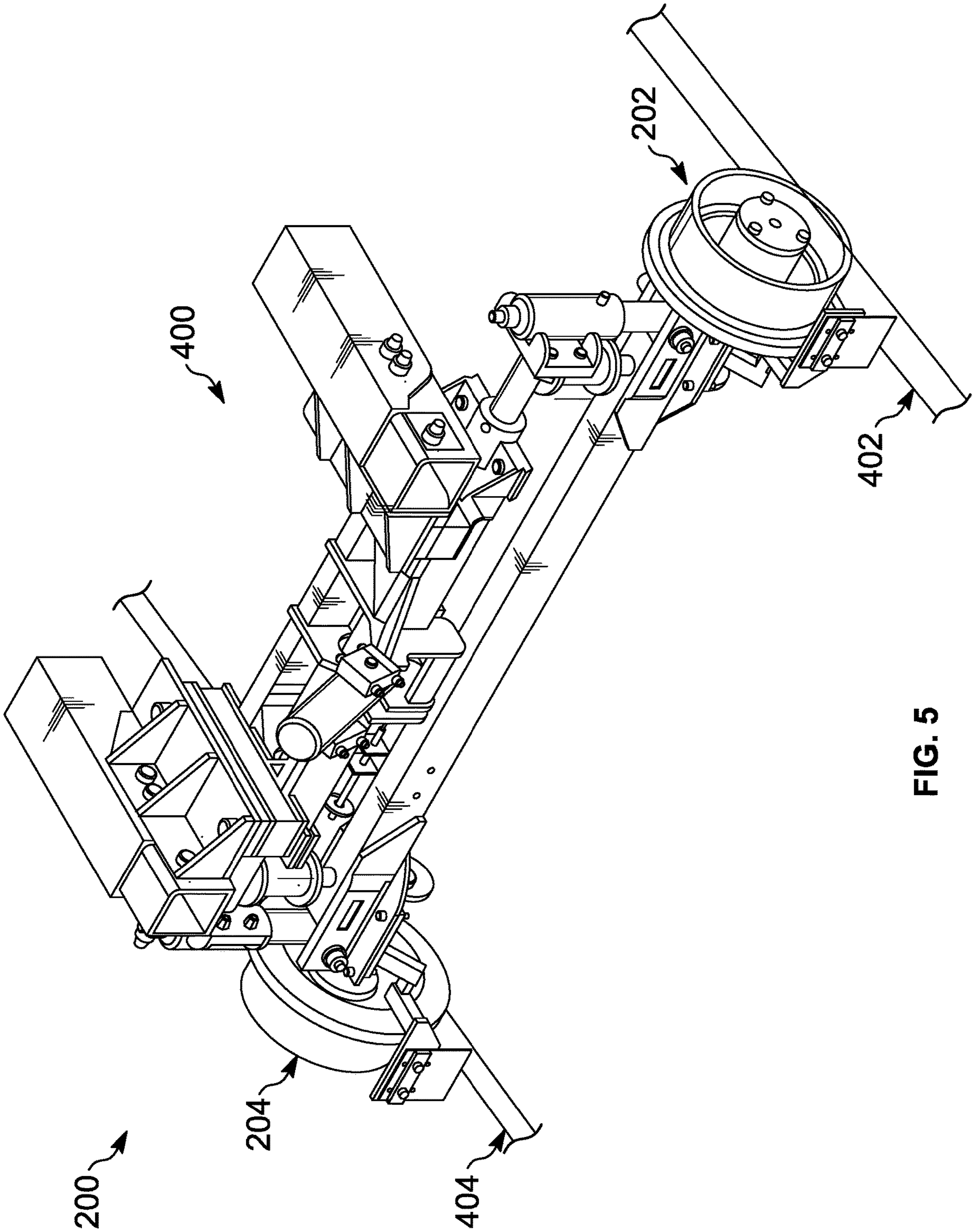
FIG. 5 illustrates a vehicle frame system in a first state in accordance with one embodiment.

FIG. 5 illustrates the vehicle frame system being in a first state 400. The vehicle frame system may be in the first state while the vehicle system moves along a railway track that includes a first rail 402 and a second rail 404. For example, the first and second guide wheels may be in direct contact with the first and second rails, respectively, responsive to the vehicle frame system being in the first state. The first and second guide wheels may be used by the vehicle system to enable the vehicle system to move along a railway track.

Figure 6:
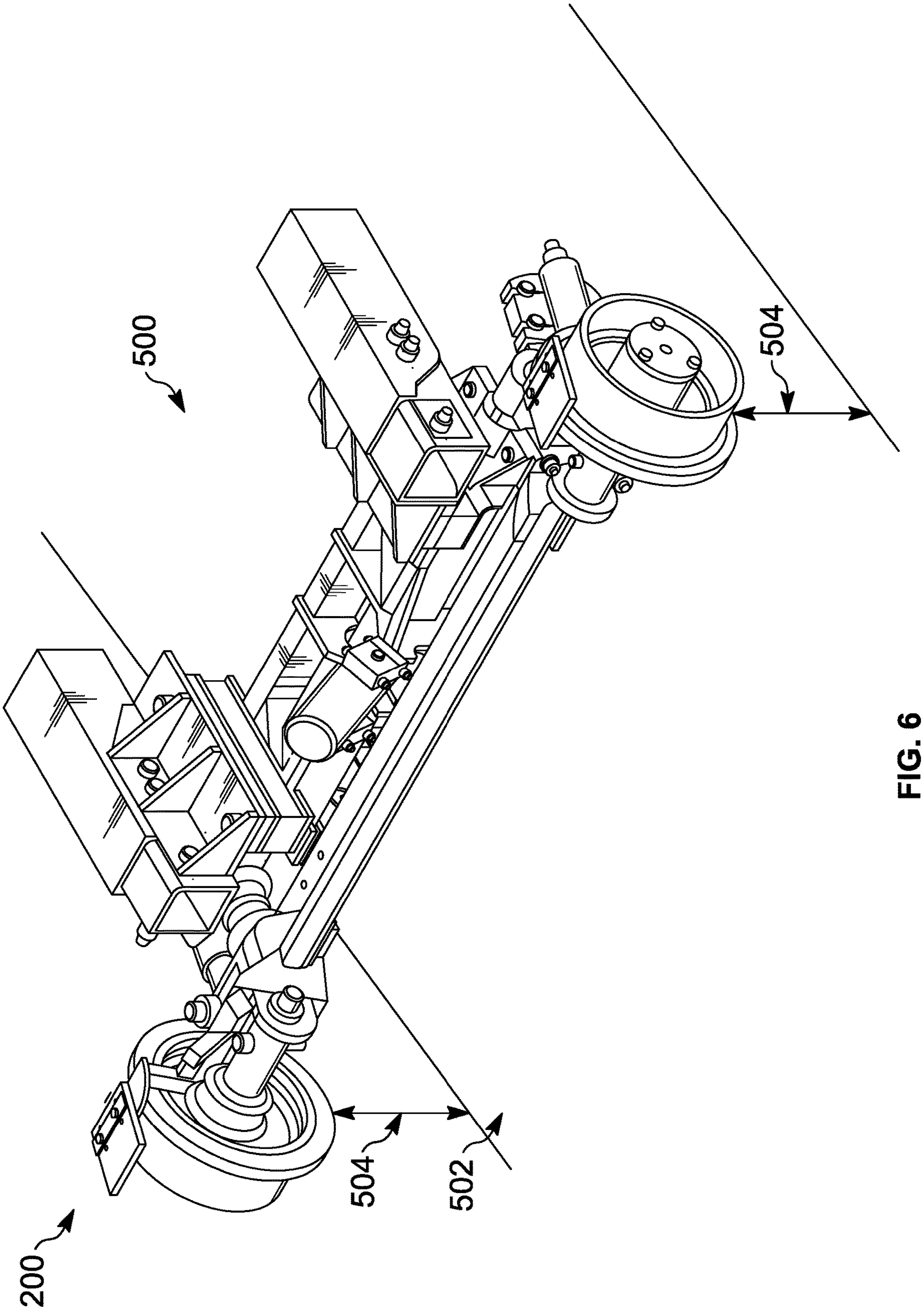
FIG. 6 illustrates a vehicle frame system in a second state in accordance with one embodiment.

Alternatively, FIG. 6 illustrates the vehicle frame system being in a second state 500. The vehicle frame system may be in the second state based on the vehicle system moving along a non-rail route 502. For example, the first and second guide rails are separated from the route by a distance 504 responsive to the vehicle frame system being in the second state. The first and second guide rails are not used by the vehicle system to move along the non-rail route.

With reference to FIGS. 5 and 6, in order to move the vehicle frame system between the first and second states, the actuator device moves between a deployed state or position, and a non-deployed state or position. For example, to move the axle of the vehicle frame system to the first state from the second state, the actuator device is controlled to move to a deployed state, deployed position, extended position, or the like, from a non-deployed state. Moving the actuator device to the deployed state or deployed position causes rotational movement of the frame bar of the lower cross frame assembly in a first rotational direction, and linear movement of the guide shafts of the guide assemblies. Alternatively, to move the axle of the vehicle frame system to the second state from the first state, the actuator device is controlled to move to a non-deployed state, a non-deployed position, a retracted state, or the like, from a deployed state. Moving the actuator device to a retracted state causes rotational movement of the frame bar of the lower cross frame assembly in a second rotational direction that is opposite the first rotational direction, and linear movement of the guide shafts of the guide assemblies.

In one or more embodiments, the controller of the vehicle system may control operation of the actuator device to move the vehicle frame system between the different states. For example, the controller may automatically control movement of the vehicle frame system responsive to the sensor(s) communicating sensor data to the controller that indicates that the vehicle system is moving on a rail or non-rail route. Optionally, the controller may control movement of the vehicle frame system responsive to an operator of the vehicle system communicating to the controller that the vehicle system is or will be moving onto a railway track and off from a non-rail route. Optionally, a remote controller (not shown) disposed off-board the vehicle system may control movement of the actuator device to move the vehicle frame system between the different states. In one or more embodiments, the vehicle frame system may move between the different states while the vehicle system is moving, or while the vehicle system is stationary.

In one or more embodiments, the vehicle system may include a first vehicle frame system (e.g., a front railgear unit) coupled with a forward axle of the vehicle system, and a second vehicle frame system (e.g., a rear railgear unit) coupled with a rearward axle of the vehicle system. The controller of the vehicle system may independently control operation of the first and second vehicle frame systems. For example, the controller may control the one or more actuators of the first vehicle system to move to a first position of a deployed state, and may independently control the one or more actuators of the second vehicle system to move to a different, second position of a deployed state. Optionally, control of at least one actuator may control operation of the other actuators of the first and/or second vehicle frame system. For example, the controller may control each actuator of the vehicle system with a single control signal.

In one or more embodiments, one or more components of the vehicle frame system may be manufactured of an aluminum alloy, and one or more other components may be manufactured of a steel alloy. For example, one or more of the components of the vehicle frame system may be manufactured of aluminum and not manufactured of steel in order to control a weight of the vehicle frame system. For example, the vehicle frame system that is made up of aluminum components and steel components may have a total weight that is less than a weight of a vehicle frame system manufactured of only steel components. In one or more embodiments, at least the frame bar, the frame mounting device, the first and second end plates, the axle, and the guide assemblies may be manufactured of one or more different aluminum alloys. Optionally, the components may be manufactured of alternative materials that have one or more material properties (e.g., weight, density, hardness, or the like) that are similar to aluminum. Optionally, the components of the vehicle frame system may be manufactured of the same or similar materials. For example, each component of the vehicle frame system may be manufactured of a steel alloy.

The vehicle frame system may include plural different bearings disposed at different locations of movement of the assembly. In one embodiment, the vehicle frame system may include one or more bearings disposed between the frame bar and the frame mounting device. Optionally, the vehicle frame system may include one or more bearings disposed within the guide assemblies to allow movement of the guide shafts within the guide tubes in a linear direction 252 (shown in FIG. 2). The bearings may be manufactured of steel alloys, or the like.

Figure 7:
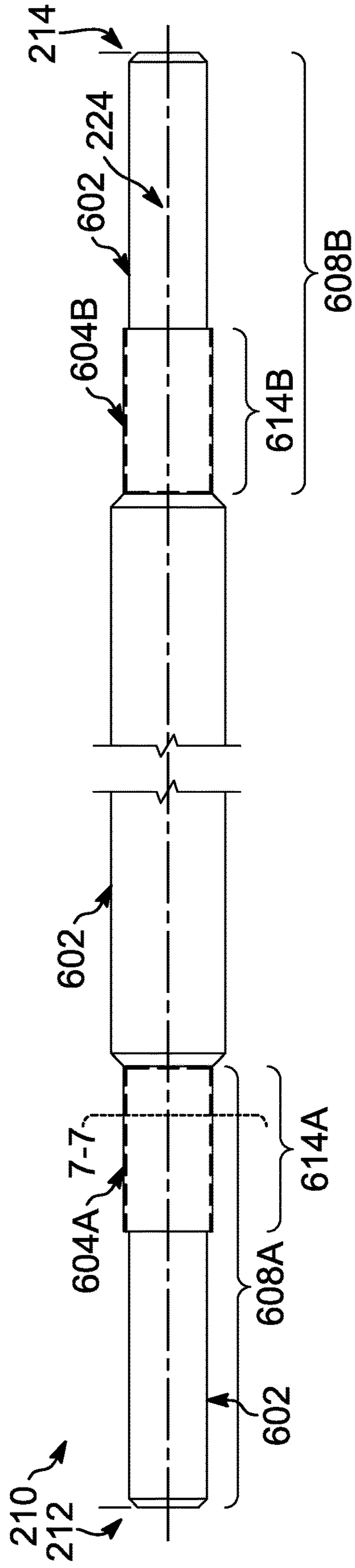
FIG. 7 illustrates a side view of a frame bar of a vehicle frame system in accordance with one embodiment.
Figure 8:
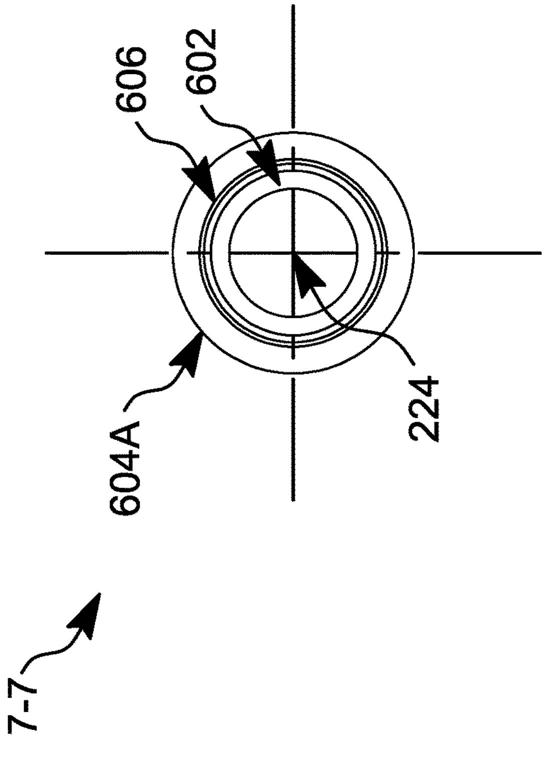
FIG. 8 illustrates a cross-sectional view of the frame bar illustrated in FIG. 7.

In order to control an amount of wear between dissimilar materials, the vehicle frame system may include sleeves disposed at mating locations of the dissimilar materials of the vehicle frame system. For example, FIG. 7 illustrates a side view of the frame bar of the lower cross frame assembly in accordance with one embodiment, and FIG. 8 illustrates a cross-sectional view of the frame bar shown in FIG. 7. The frame bar extends between the first and second ends 212, 214 along the frame axis or the first axis 224. The frame may be manufactured of an aluminum alloy, or the like.

The frame bar includes an external circumferential surface 602 along the length of the frame bar. The lower cross frame assembly includes at least one first sleeve 604A that is disposed over at least a portion of the external circumferential surface of the frame bar. The frame bar may extend a length 608A, and the first sleeve may be disposed over a portion 614A of the length of the frame bar. The first sleeve includes a first internal surface 606 that is operably coupled with the external circumferential surface of the frame bar. In one or more embodiments, the first sleeve may be disposed at a mating location between the frame bar and a bearing (not shown) of the lower cross frame assembly such that the first sleeve is disposed between the bearing and the external circumferential surface of the frame bar. For example, the first sleeve separates the frame bar from the bearing.

In one or more embodiments, the sleeve may be manufactured of a material that is different than a material of the frame bar. For example, the frame bar may be manufactured of an aluminum alloy, and the first sleeve may be manufactured of a steel alloy. Optionally, the frame bar and/or the first sleeve may be manufactured of any alternative metallic alloys, engineered materials, a plastic material, or the like. The materials of the first sleeve and the bearing may be similar, and the similar materials may be different than the material of the frame bar. The first sleeve is configured for a temperature to be controlled to change one or more characteristics of the first sleeve. For example, the temperature of the first sleeve may be increased to a predetermined temperature threshold, and the increase of temperature of the first sleeve may change one or more material properties of the first sleeve. For example, increasing the temperature of the first sleeve increase a cross-sectional size of the first sleeve (e.g., relative to the cross-sectional size of the first sleeve at the decreased or reduced temperature). The increased cross-sectional area of the first sleeve allows the first sleeve to move onto the frame bar. For example, the first sleeve cannot fit onto the frame bar without first increasing or elevating the temperature of the first sleeve.

In order to assemble the first sleeve to the frame bar, the temperature of the first sleeve is controlled to increase a temperature of the first sleeve. Increasing the temperature of the first sleeve changes one or more characteristics of the material of the first sleeve, such as a size of the first sleeve. The increased cross-sectional size of the first sleeve allows the first sleeve to be inserted onto the frame bar. For example, the frame bar may be moved into an increased diameter of a center passage of the first sleeve such that the first internal surface of the first sleeve is operably coupled with a portion of the external circumferential surface of the frame bar.

The temperature of the first sleeve may again be controlled to decrease the temperature of the first sleeve, such as to an ambient temperature. Decreasing the temperature of the first sleeve to the ambient temperature changes the one or more characteristics of the material of the first sleeve. For example, decreasing the temperature of the first sleeve decreases the cross-sectional area of the first sleeve. For example, the frame bar cannot fit inside the first sleeve without first heating the first sleeve. In alternative embodiments, the temperature of the frame bar may be controlled to decrease the temperature of the frame bar to allow the first sleeve to slide onto the frame bar. For example, decreasing the temperature of the frame bar may decrease a cross-sectional size of the frame bar. Decreasing the size of the frame bar may allow the first sleeve to slide onto the frame bar.

Responsive to the change in characteristics of the material of the first sleeve, the first sleeve is prohibited from moving relative to the frame bar. For example, changing the characteristics of the material of the first sleeve provides an interference fit between the first sleeve and the frame bar such that the first sleeve is prohibited from moving relative to the frame bar. The interference fit between the first sleeve and the frame bar may be temperature shrink fit.

In the illustrated embodiment of FIG. 7, the lower cross frame assembly includes a first sleeve 604A disposed proximate the first end of the frame bar, and a second sleeve 604B disposed proximate the second end of the frame bar. For example, the first sleeve is disposed over the external circumferential surface of the first portion 614A of the frame bar, and the second sleeve is disposed over the external circumferential surface of a second portion 614B of the frame bar along a length 608B of the frame bar. The first sleeve is interference fit on to the first end of the frame bar, and the second sleeve is interference fit on to the second end of the frame bar. Optionally, the lower cross frame assembly may include less than two or more than two sleeves disposed at different locations along the length of the frame bar.

Figure 9:
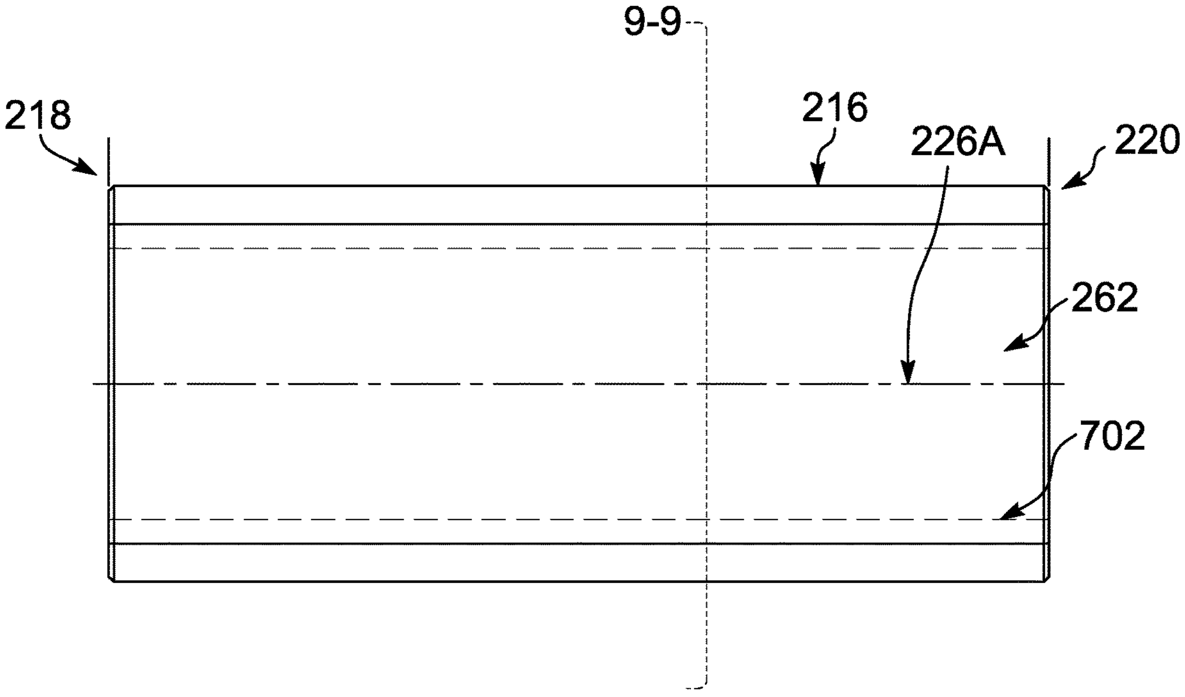
FIG. 9 illustrates a side view of a guide assembly of a vehicle frame system in accordance with one embodiment.
Figure 10:
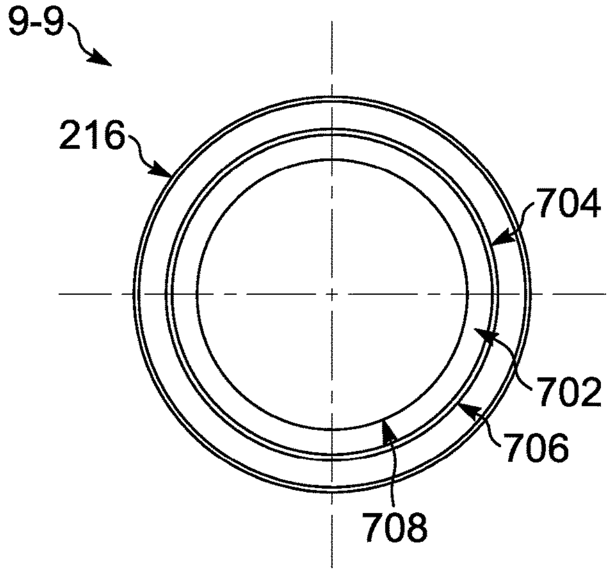
FIG. 10 illustrates a cross-sectional view of the guide assembly illustrated in FIG. 9.

FIG. 9 illustrates a side view of a portion of one of the guide assemblies in accordance with one embodiment. FIG. 10 illustrates a cross-sectional view of the guide assembly. The guide tube 216 extends along the second axis 226A between the first and second ends of the guide tube. The guide tube includes a center passage 262 through which the guide shaft (not shown) extends. The center passage of the guide tube is defined by an interior circumferential surface 704 of the guide tube. The guide assembly includes a sleeve 702 disposed within the at least a portion of the center passage. Referring to FIG. 2, the vehicle frame system may include two guide assemblies, each disposed at an end of the lower cross frame assembly. Each of the first and second guide assemblies are coupled with the frame bar, and each of the first and second guide assemblies include a guide tube and sleeve disposed within a portion of the guide tube. The sleeves of the guide assemblies may be referred to herein as second or third sleeves.

The second sleeve includes an exterior surface 706 that is operably coupled with the internal circumferential surface of the guide tube. For example, the second sleeve is disposed between the guide tube and the guide shaft extending through the center passage of the guide tube such that the second sleeve separates the interior circumferential surface of the guide tube from an exterior surface of the guide shaft. In the illustrated embodiment of FIG. 9, the second sleeve extends substantially between the first and second ends of the guide tube, but alternatively may extend a length that is greater or less than a length of the guide tube.

In one or more embodiments, the second sleeve may be manufactured of a material that is different than a material of the guide tube. For example, the guide tube may be manufactured of an aluminum alloy, a magnesium alloy, a titanium alloy, or the like, and the second sleeve (and optionally the guide shaft) may be manufactured of a steel alloy, a brass alloy, a bronze alloy, a tin alloy, or the like. Optionally, the guide tube and/or the second sleeve may be manufactured out of any alternative materials such as, but not limited to, other metallic alloys, engineered materials, other plastic materials, or the like. For example, the guide tube and the second sleeve may both be manufactured of metals, but the metal material of the guide tubes may have a weight or density that is less than a weight or density of the metal material of the second sleeve.

Like the first sleeve of the lower cross frame assembly, a temperature of the second sleeve is controlled in order to change one or more characteristics of the second sleeve. Unlike the first sleeve of the lower cross frame assembly, the temperature of the second sleeve may be decreased to change the one or more characteristics of the material of the second sleeve and to assemble the second sleeve inside the guide tube. For example, the temperature of the second sleeve may be decreased to a predetermined temperature threshold, and the decrease of temperature of the second sleeve may change one or more properties of the second sleeve. For example, decreasing the temperature of the second sleeve decreases a cross-sectional area of the second sleeve (e.g., relative to the cross-sectional area of the second sleeve at the increased or elevated temperature). The decreased cross-sectional area or size of the second sleeve allows the second sleeve to be inserted into the guide tube. For example, the second sleeve cannot fit inside the guide tube without first cooling or reducing the temperature of the second sleeve.

In order to assemble the second sleeve to the guide tube, the temperature of the second sleeve is controlled to decrease the temperature of the second sleeve to change one or more characteristics of the material of the second sleeve, such as a size of the second sleeve. While the second sleeve is at the decreased or reduced temperature, the second sleeve is positioned within a portion of the guide tube such that the exterior surface of the second sleeve is operably coupled with the internal circumferential surface of the guide tube. After or subsequent to the second sleeve being positioned within the guide tube, the temperature of the second sleeve is controlled to increase to a higher temperature, such as to an ambient temperature. Increasing the temperature of the second sleeve to the ambient temperature changes the one or more characteristics of the second sleeve. For example, increasing the temperature of the material of the second sleeve may increase the cross-sectional size of the second sleeve.

Responsive to the change in characteristics of the material of the second sleeve, the second sleeve is prohibited from moving relative to the guide tube. For example, increasing the cross-sectional area of the second sleeve after the second sleeve is inserted into the guide tube by increasing the temperature of the second sleeve provides an interference fit between the second sleeve and the guide tube such that the second sleeve is prohibited from moving relative to the guide tube. In one embodiment, the interference fit between the second sleeve and the guide tube may be temperature fit or a temperature shrink fit. Alternatively, the temperature of the guide tube may be controlled to increase the temperature to allow the second sleeve to be positioned inside the guide tube with an interference fit between the second sleeve and the guide tube. For example, increasing the temperature of the guide tube may increase a cross-sectional size of the guide tube. Increasing the size of the guide tube may allow the second sleeve to be inserted into the guide tube.

In one or more embodiments, the sleeves may be coupled with the frame bar and/or guide tubes by alternative coupling methods. For example, the sleeves may include interference fits with the frame bar and guide tubes, and the vehicle frame system may include additional fastener devices to maintain the assembled positions of the sleeves relative to the guide tubes (e.g., screws, mating features, or the like). Optionally, the sleeves may include threads and may be threaded into and/or onto corresponding threads of the frame bar and/or guide tubes.

Figure 11:
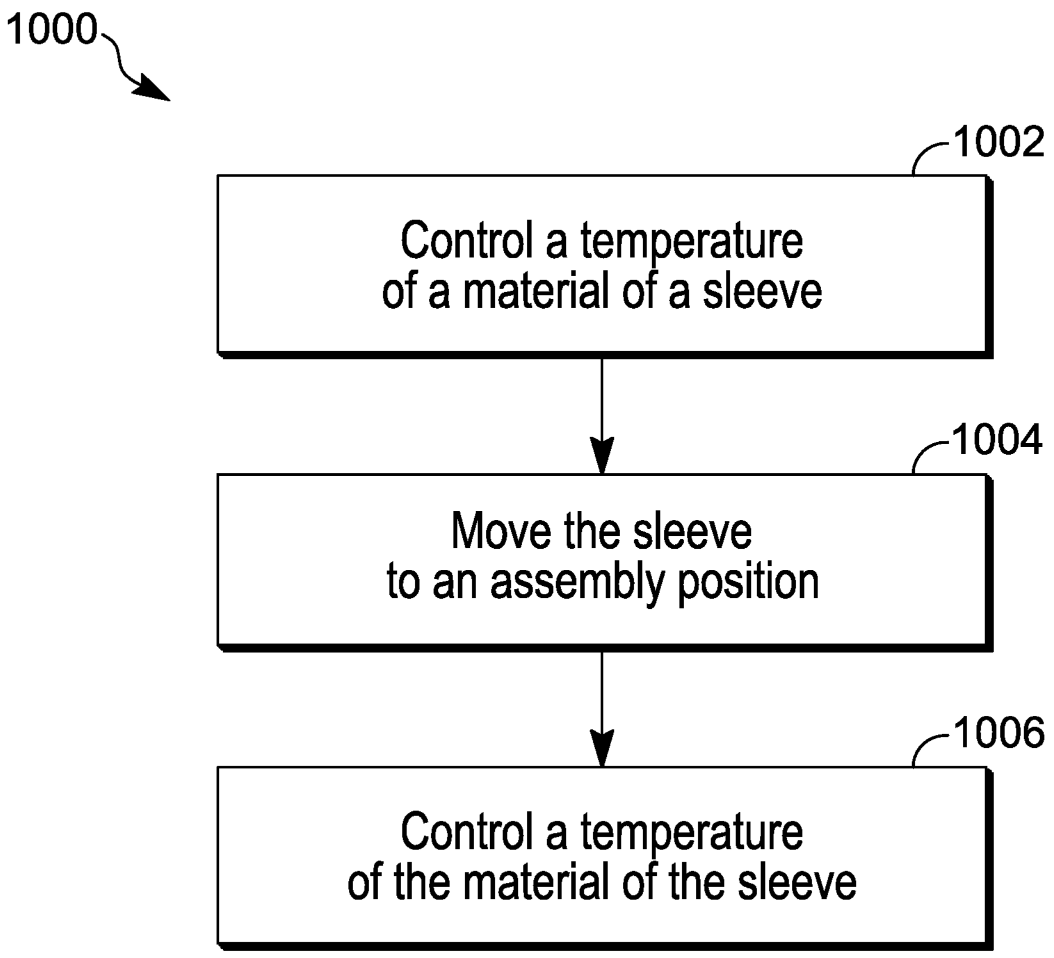
FIG. 11 illustrates a flowchart of a method of assembling a vehicle frame system in accordance with one embodiment.

FIG. 11 illustrates a flowchart 1000 of a method of assembling a vehicle frame system in accordance with one embodiment. The vehicle frame system may be referred to as a railgear or railgear system for a hi-rail vehicle. The vehicle frame system may move between different states to enable the hybrid hi-rail vehicle to operate as a rail vehicle or to enable the hybrid hi-rail vehicle to operate as a non-rail vehicle. For example, the vehicle frame system includes first and second guide wheels that may be used to control movement, or control a direction of movement of the hybrid vehicle as the hybrid vehicle moves along a railway track. The position of the first and second guide wheels may be changed such that the first and second guide wheels may be in direct contact with the railway track while the vehicle frame system is in the first state. Alternatively, the position of the first and second guide wheels may be changed such that the first and second guide wheels may not be in contact with, or may be separated from a non-rail route while the vehicle frame system is in the second state.

The vehicle frame system may include one or more components that may be manufactured of aluminum alloys, and one or more other components that may be manufactured of steel alloys. In order to control an amount of wear between dissimilar materials, the vehicle frame system may include sleeves disposed at mating locations of the dissimilar materials of the vehicle frame system.

At step 1002, a temperature of a material of a sleeve may be controlled to change one or more characteristics of the material of the sleeve. In one embodiment, the temperature of the sleeve may be increased to a predetermined temperature threshold to change the characteristics of the material. For example, increasing the temperature of the sleeve may increase a size of the sleeve. Optionally, the temperature of the sleeve may be decreased to a different predetermined temperature threshold to change the characteristics of the material. For example, decreasing the temperature of the sleeve may decrease the size of the sleeve. The size of the sleeve may be increased to allow the sleeve to slide or move onto a mating component. Alternatively, the size of the sleeve may be decreased to allow the sleeve to be positioned within a mating component.

At step 1004, the sleeve at the changed temperature is moved to an assembly position. The sleeve may be moved into and/or onto another component of the vehicle frame system, where the other component of the vehicle frame system may be manufactured of a non-steel material, such as, but not limited to, an aluminum alloy. In one embodiment, a size of the sleeve may be changed to allow the sleeve to move to a position over an external surface of the other component (e.g., the frame bar of the vehicle frame system). In another embodiment, a size of the sleeve may be changed to allow the sleeve to move to a position within the other component such that an external surface of the sleeve is coupled with an internal surface of the other component (e.g., the guide tube of the vehicle frame system).

At step 1006, the temperature of the material of the sleeve is again controlled to change the temperature of the sleeve. The temperature may be decreased or be reduced to a reduced temperature, such as an ambient temperature. Decreasing the temperature of the sleeve changes the one or more characteristics of the material of the sleeve. For example, decreasing the temperature of the sleeve may decrease a size of the sleeve. Alternatively, increasing the temperature of the sleeve may increase the size of the sleeve. Responsive to the change in characteristics of the material of the sleeve, the sleeve is prohibited from moving out or away from the assembly position. For example, changing the characteristics of the material provides an interference fit between the sleeve and the other component to which the sleeve is assembled with. In one embodiment, the interference fit between the sleeve and the other component may be temperature shrink fit.

Figure 12:
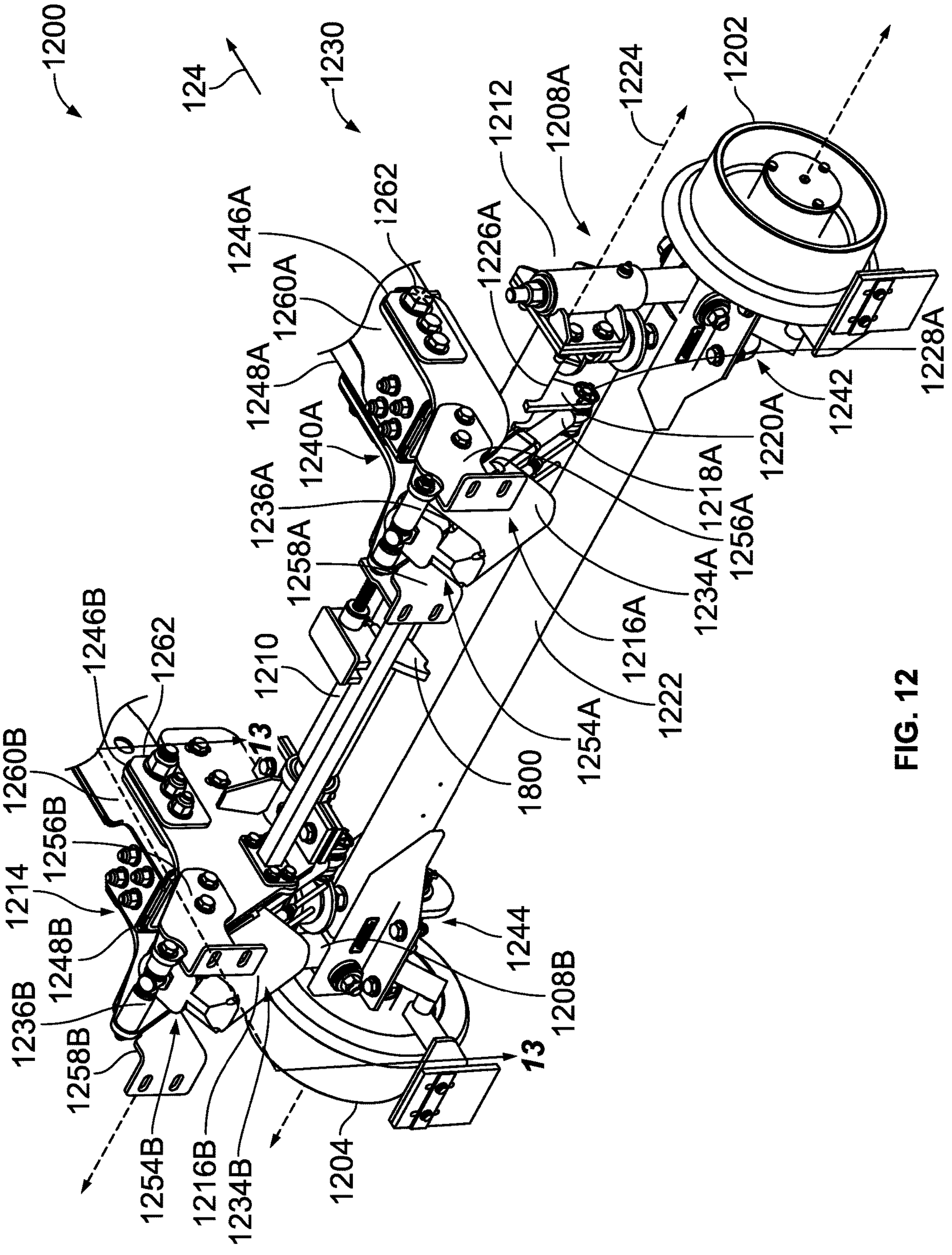
FIG. 12 illustrates a perspective view of a first vehicle frame assembly in a first state in accordance with one embodiment.
Figure 13:
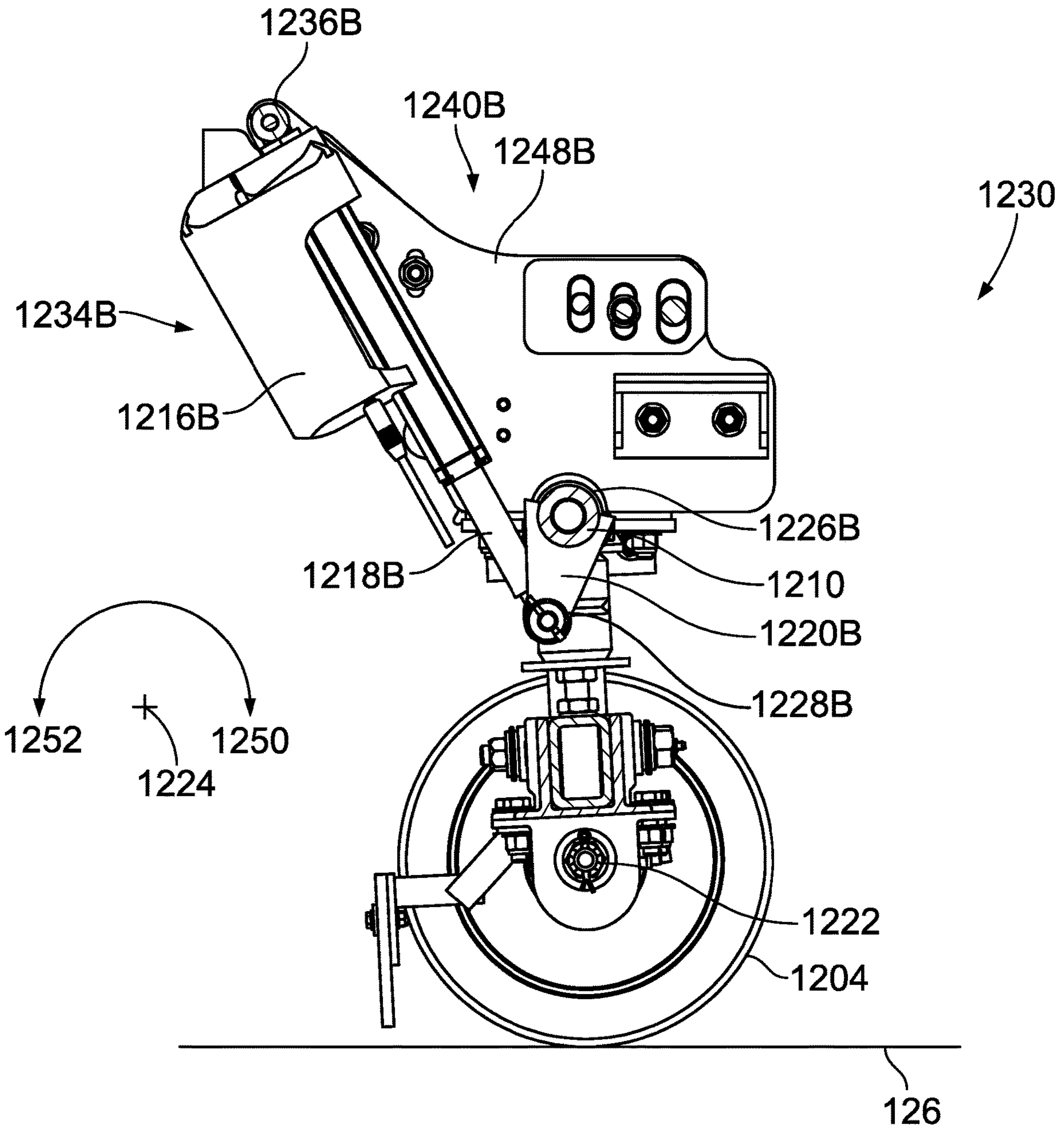
FIG. 13 illustrates a side cross-sectional view of the first vehicle frame assembly illustrated in FIG. 12.
Figure 14:
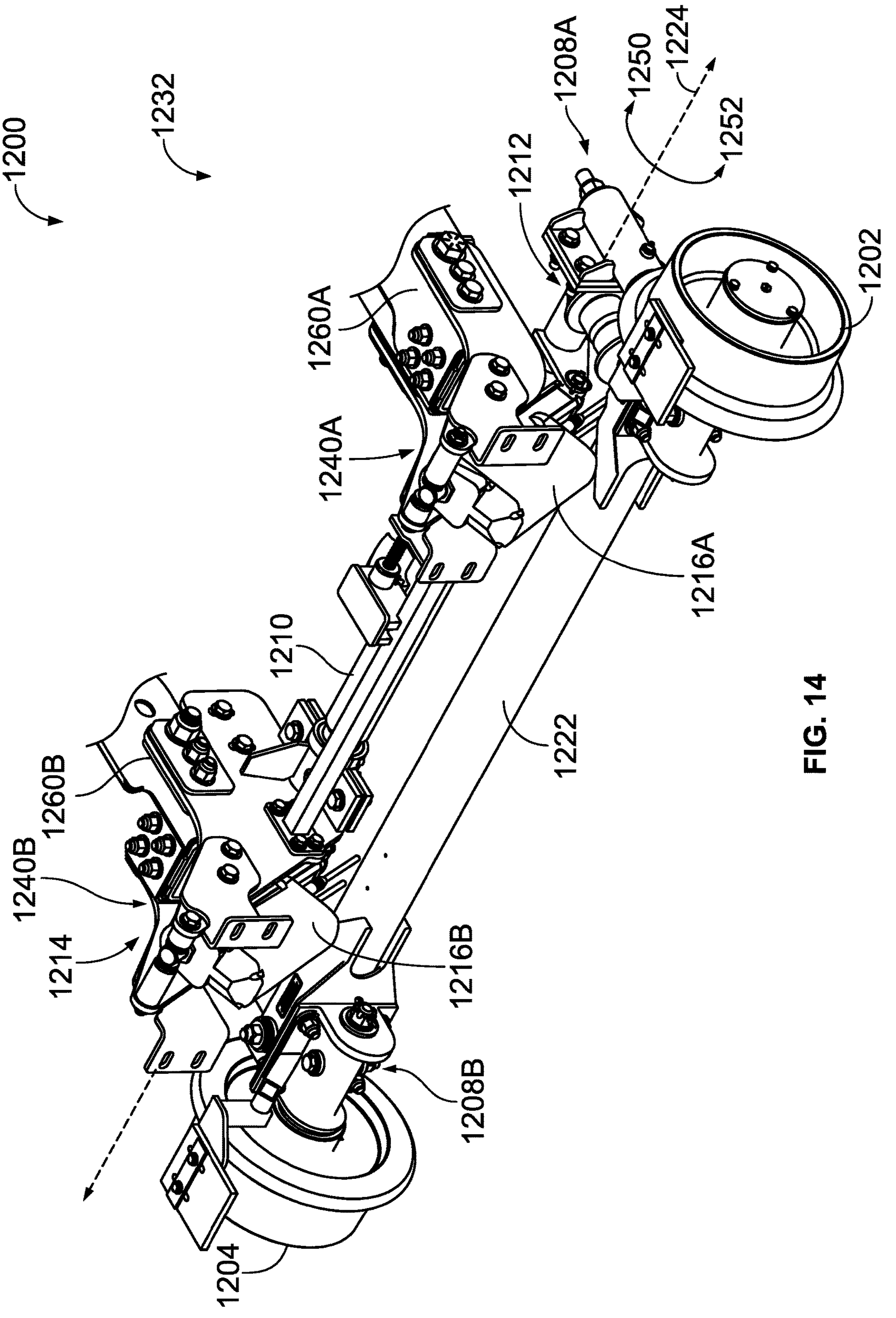
FIG. 14 illustrates a perspective view of the first vehicle frame assembly in a second state in accordance with one embodiment.

FIG. 12 illustrates a perspective view of a first vehicle frame assembly 1200 in a first state 1230, in accordance with one or more embodiments. FIG. 13 illustrates a side cross-sectional view of the first vehicle frame assembly. FIG. 14 illustrates a perspective view of the first vehicle frame assembly in a second state 1232. FIGS. 12-14 will be described together herein.

The first vehicle frame assembly 1200 may represent the first vehicle frame assembly 200A illustrated in FIG. 1. For example, the first vehicle frame assembly may be operably coupled with the frame 128 of the hi-rail vehicle 116 proximate the first end 130 of the frame 128 in the direction of travel 124 of the vehicle system 100. The first vehicle frame assembly 1200 includes a first frame bar 1210 that extends between a first end 1212 and a second end 1214 along a first axis 1224. The first vehicle frame assembly includes a first guide assembly 1208A disposed at the first end of the first frame bar, and a second guide assembly 1208B disposed at the second end of the first frame bar.

The first and second guide assemblies may be similar to the guide assemblies previously described. For example, the first and second guide assemblies may operably couple the first frame bar with a first axle 1222. In one or more embodiments, the first guide assembly may be coupled with the first end of the first frame bar and a third end 1242 of the first axle. Additionally, the second guide assembly may be coupled with the second end of the first frame bar and a fourth end 1244 of the axle. The first frame assembly includes a first guide wheel 1202 that is operably coupled with the third end of the axle, and a second guide wheel 1204 that is operably coupled with the fourth end of the axle. In one or more embodiments, the axle may be referred to as a lower cross frame assembly.

In the illustrated embodiments, the first vehicle frame assembly includes a first housing 1240A and a second housing 1240B that are operably coupled with the first frame bar. The first housing includes a first panel 1246A and a second panel 1248A that define a pocket 1254A. Additionally, the second housing includes a first panel 1246B and a second panel 1248B that define a pocket 1254B. The first and second panels of both of the first and second housings include passages through which the first frame bar extends. In one or more embodiments, the first and second housings may be referred to herein as an upper cross frame assembly.

In one or more embodiments, one or more components of the upper cross frame assembly (e.g., the first and second panels of the first and second housings, respectively, one or more components of the first guide assembly, one or more components of the second guide assembly, or the like), the first frame bar, the first axle, components coupling the first and second guide wheels to the first axle, or the like, may be manufactured of one or more steel alloys.

The pocket of the first housing is shaped to receive a first portion 1260A of the frame of the vehicle system, and the pocket of the second housing is shaped to receive a second portion 1260B of the frame of the vehicle system. For example, the first and second portions of the frame may be coupled with the first and second housings, such as by one or more fasteners 1262. The fasteners may represent screws, bolts, weld joints, or any additional and/or alternative fastener device.

The pocket of the first housing is shaped and sized to receive a first actuator system 1234A. The first actuator system 1234A includes a first actuator device 1216A. The first actuator device is operably coupled with the first and second panels of the first housing via a first coupling feature 1236A. In the illustrated embodiment, the first coupling feature is a rod that extends through corresponding passages of the first actuator device and the first and second panels. For example, the rod allows the first actuator device to pivot or rotate relative to the first and second panels of the first housing. Optionally, the first actuator device may be operably coupled with the first housing via an alternative coupling feature, additional and/or alternative coupling components, or any combination therein.

The first actuator device includes a first extension component 1218A that extends into and moves out of the first actuator device. A free end of the extension component is operably coupled with the first frame bar via a first linkage component 1220A. For example, the free end of the extension component is operably coupled with a first portion 1228A of the first linkage component, and the first frame bar is operably coupled with a second portion 1226A of the first linkage component. The second portion of the first linkage component includes a passage that is shaped and sized to receive the first frame bar therein. The first linkage component and the first actuator device operably couple the first housing with the first frame bar of the first vehicle frame assembly. For example, the first actuator system extends between the first housing and the first frame bar.

Additionally, the pocket of the second housing is shaped and sized to receive a second actuator system 1234B. The second actuator system 1234B includes a second actuator device 1216B. Like the first actuator device, the second actuator device is operably coupled with the first and second panels of the second housing via a second coupling feature 1236B, such as a rod that extends through corresponding passages of the second actuator device and the first and second panels.

The second actuator device also includes a second extension component 1218B that extends into and moves out of the second actuator device. A free end of the extension component is operably coupled with the first frame bar via a second linkage component 1220B. For example, the free end of the extension component is operably coupled with a first portion 1228B of the second linkage component, and the first frame bar is operably coupled with a second portion 1226B of the second linkage component. The second portion of the second linkage component includes a passage that is shaped and sized to receive the first frame bar therein. The second linkage component and the second actuator device operably couple the second housing with the first frame bar of the first vehicle frame assembly. For example, the second actuator system extends between the second housing and the first frame bar.

In one or more embodiments, the first and second actuator devices may be referred to as first and second electric actuator devices. For example, the first and second electric actuator devices may be electrically powered, such as by receiving power from another system and/or component of the vehicle system (e.g., via a wired connection to a system and/or component of the vehicle system, not shown), by receiving power from an energy storage device of the vehicle system (not shown), by receiving power from corresponding first and second energy storage devices of the first and second actuator systems (not shown), or any combination therein.

In one or more embodiments, the first and second electric actuator devices may be the same type, make, model, or the like. For example, the first electric actuator device may be designed to produce a first amount of power, and the second electric actuator device may be designed to produce the same first amount of power. In alternative embodiments, the first electric actuator device may be a different type, make, model, or the like, relative to the second electric actuator device. For example, the first and second electric actuator devices may have different ratings, may produce different amounts of power, or the like.

In one or more embodiments, the power produced by the first and second actuator devices may be combined to control rotational movement of the first frame bar. For example, the first actuator system and the second actuator system may work together in unison to produce or generate power that causes the first frame bar to rotate in a first direction of rotation 1250 or a second direction of rotation 1252 about the first axis 1224. In the illustrated embodiment, rotating the first frame bar in the first direction of rotation 1250 causes the first axle 1222 to move away from the route 126, and towards the second state 1232 (shown in FIG. 14). Alternatively, rotating the first frame bar in the second direction of rotation 1252 causes the first axle 1222 to move toward the route, and toward the first state 1230 (shown in FIGS. 12 and 13).

In the illustrated embodiments shown in FIGS. 12-14, the extension components of the first and second electric actuator devices are in extended states while the first and second guide wheels 1202, 1204 are in contact with the route. For example, the first vehicle frame assembly may be in the first state 1230 while the first and second extension components are extended out of the first and second electric actuator devices, respectively. To change the first vehicle frame assembly from the first state 1230 to the second state 1232, the extension components of the first and second electric actuator devices may be pulled into the respective first and second electric actuator devices. Pulling the extension components into the first and second electric actuator devices causes the first and second linkage components 1220A, 1220B to rotate, and thereby causing the first frame bar to rotate in the first direction of rotation 1250 about the first axis 1224. Rotating the first frame bar in the first direction of rotation moves the first axle (and the first and second guide wheels) away from the route.

Alternatively, to change the first vehicle frame assembly from the second state 1232 to the first state 1230, the extension components of the first and second electric actuator devices are pushed out or extend out from the respective first and second electric actuator devices, causing the first and second linkage components to rotate, and thereby causing the first frame bar to rotate in the second direction of rotation 1252 about the first axis 1224. Rotating the first frame bar in the second direction of rotation moves the first axle (and the first and second guide wheels) towards the route.

Optionally, the first vehicle frame assembly may be arranged such that the extension components of the first and second electric actuator devices may be pushed out or extend out from the respective first and second electric actuator devices to move the first frame bar in the first direction of rotation. Additionally, the extension components may be pulled into or recess into the respective first and second electric actuator devices to move the first frame bar in the second direction of rotation. For example, the first and second actuator systems may have an alternative arrangement such that to move the first axle towards the route, the extension components may be pulled into the actuator devices, and to move the first axle away from the route, the extension components may be pushed out of the actuator devices.

In one or more embodiments, the first and second electric actuator devices may be capable of producing an amount of combined power to control the rotational movement of the first frame bar, such as based on the weight of the components of the vehicle frame assembly. For example, a determined required amount of power may be needed to control rotational movement of the first frame bar, and the first and second electric actuator devices may be capable of generating a combined amount of power that meets or exceeds the determined required amount of power. In one or more embodiments, the first and second electric actuator devices may be capable of generating the same or substantially the same amount of power, that may be combined to meet and/or exceed the determined required amount of power. For example, the determined required amount of power may be provided substantially equally by the first and second electric actuator devices. Alternatively, the determined required amount of power may be provided in unequal amounts and/or quantities by the first and second electric actuator devices.

Figure 15:
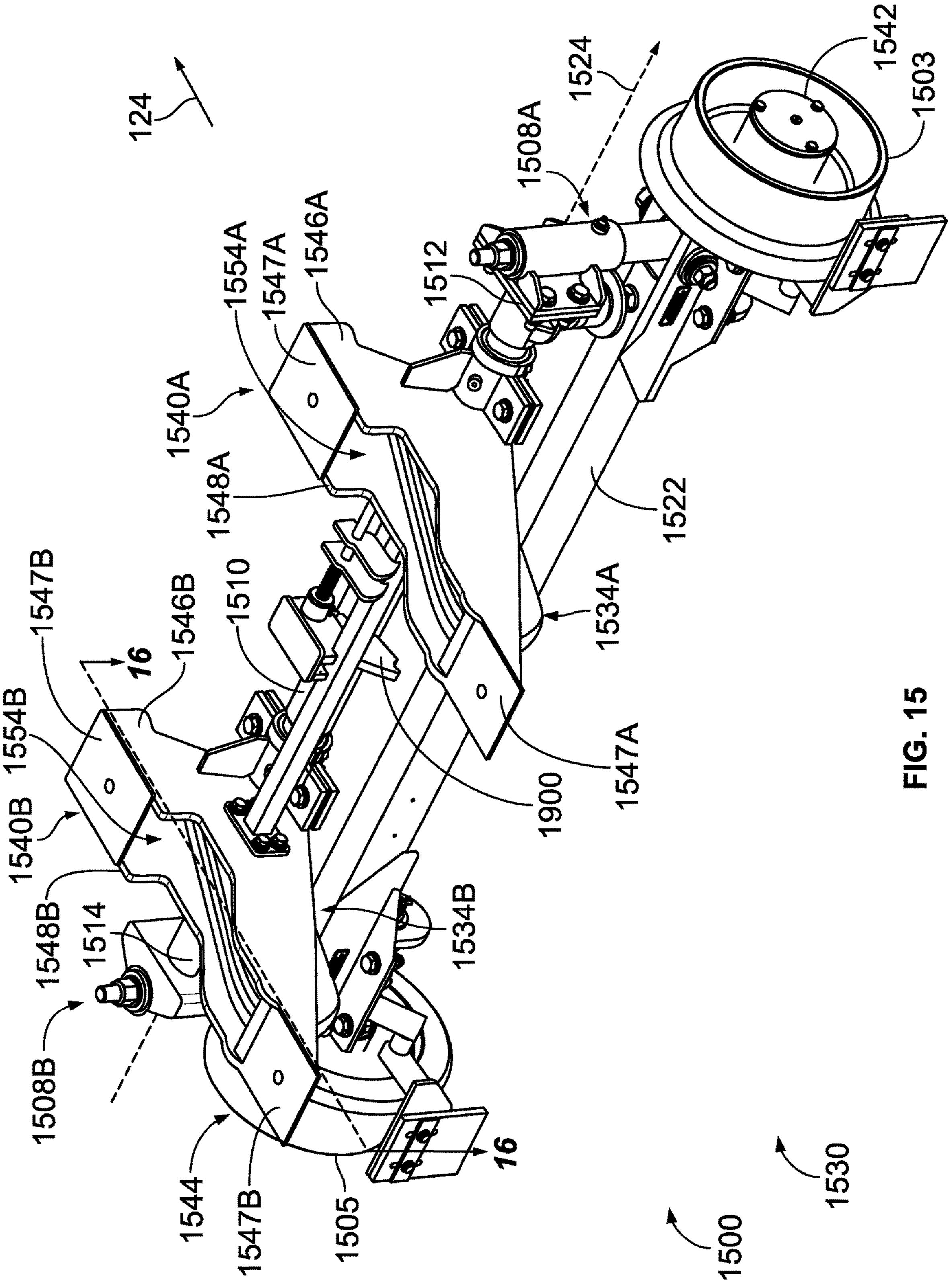
FIG. 15 illustrates a perspective view of a second vehicle frame assembly in a first state in accordance with one embodiment.
Figure 16:
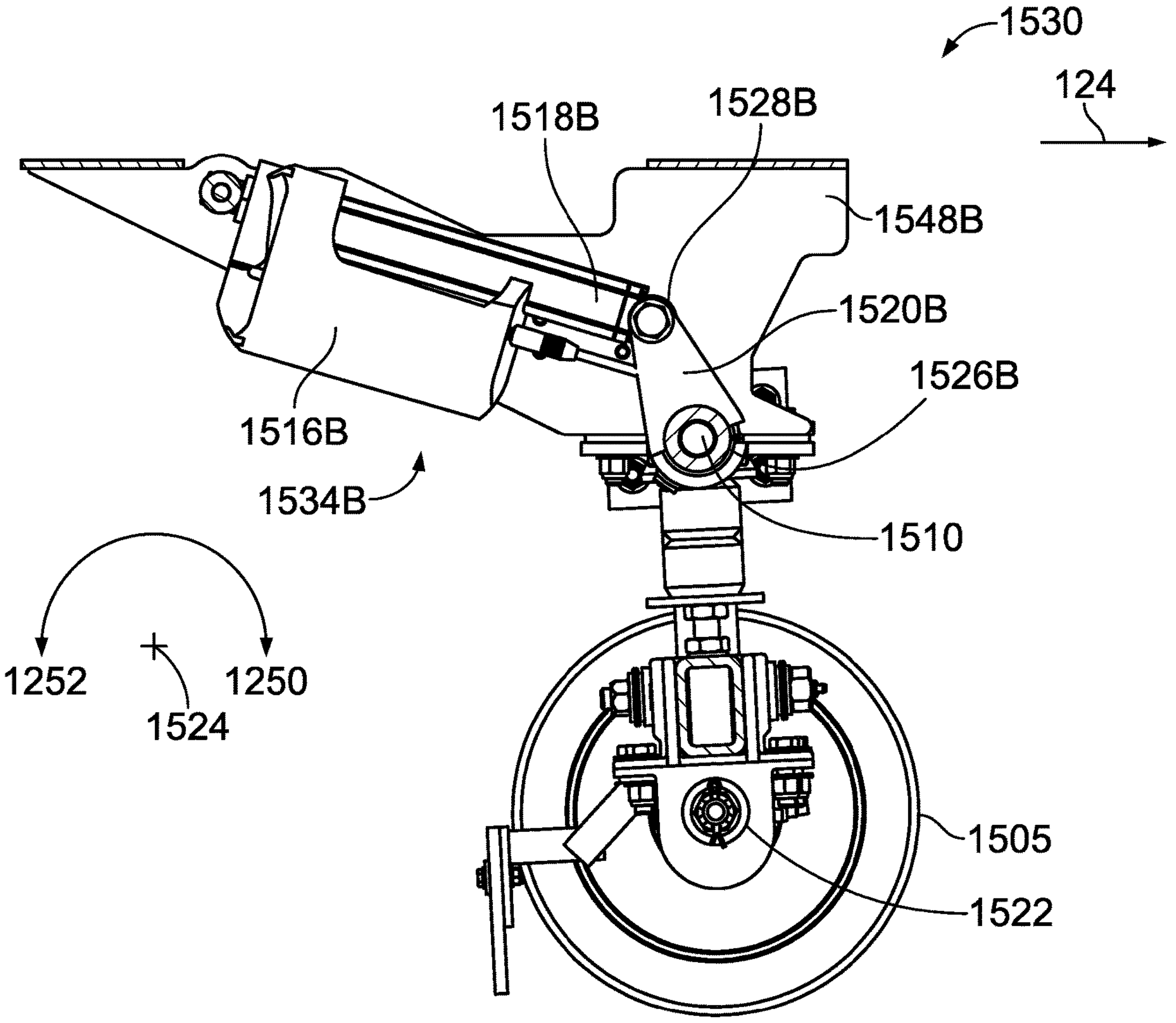
FIG. 16 illustrates a side cross-sectional view of the second vehicle frame assembly illustrated in FIG. 15.
Figure 17:
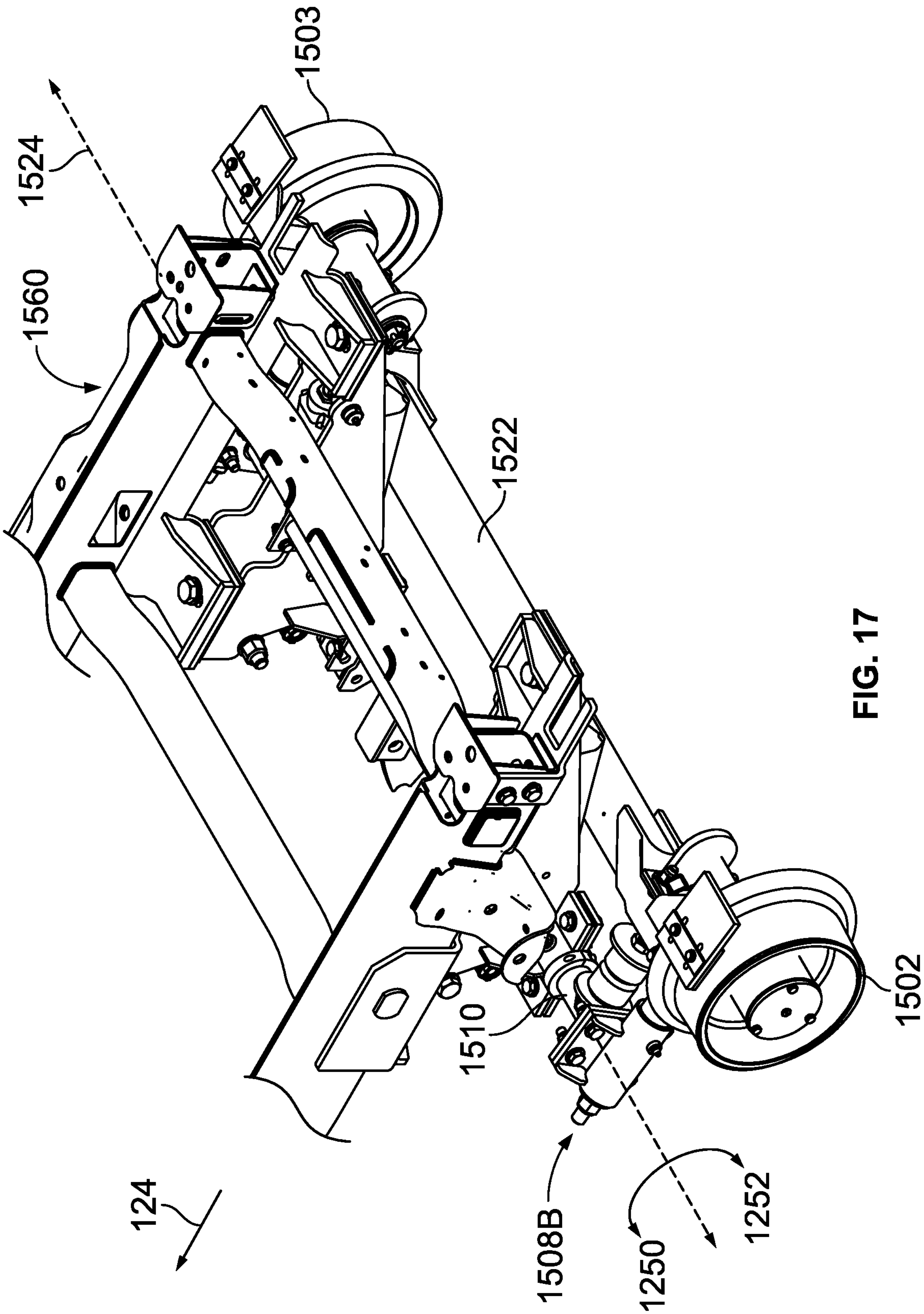
FIG. 17 illustrates a perspective view of the second vehicle frame assembly in a second state in accordance with one embodiment.

FIG. 15 illustrates a perspective view of a second vehicle frame assembly 1500 in a first state 1530 in accordance with one embodiment. FIG. 16 illustrates a side cross-sectional view of the second vehicle frame assembly. FIG. 17 illustrates a perspective view of the second vehicle frame assembly in a second state 1532. Figures will be discussed together herein.

In one or more embodiments, the second vehicle frame assembly 1500 may represent the second vehicle frame assembly 200B illustrated in FIG. 1. For example, the second vehicle frame assembly may be operably coupled with the frame 128 of the hi-rail vehicle 116 proximate the second end 132 of the frame 128 in the direction of travel 124 of the vehicle system 100. The second vehicle frame assembly 1500 includes a second frame bar 1510 that extends between a first end 1512 and a second end 1514 along a second axis 1524. The second vehicle frame assembly includes a first guide assembly 1508A disposed at the first end of the second frame bar and a second guide assembly 1508B disposed at the second end of the second frame bar. The first and second guide assemblies of the second vehicle frame assembly may be similar to the first and second guide assemblies of the first vehicle frame assembly. For example, the first and second guide assemblies may operably couple the second frame bar with a second axle 1522. The second vehicle frame assembly includes a third guide wheel 1502 that is operably coupled with a third end 1542 of the second axle, and a fourth guide wheel 1504 that is operably coupled with a fourth end 1544 of the second axle. In one or more embodiments, the second axle, and the components coupled thereto, may be referred to as a lower cross frame assembly.

In the illustrated embodiments, the second vehicle frame assembly includes a first housing 1540A and a second housing 1540B that are operably coupled with the second frame bar. The first housing includes a first panel 1546A and a second panel 1548A that define a pocket 1554A. Additionally, the second housing includes a first panel 1546B and a second panel 1548B that define a pocket 1554B. The first and second panels of both the first and second housings include passages through which the second frame bar extends. In one or more embodiments, the first and second housings may be referred to herein as an upper cross frame assembly.

In the illustrated embodiments, the first housing 1540A includes plural surfaces 1547A that extend between the first and second panels 1546A, 1548A of the first housing. Additionally, the second housing 1540B includes plural surfaces 1547B that extend between the first and second panels 1546B, 1548B of the second housing. For example, the first and second panels of the first and second housings extend in first planar directions that are substantially perpendicular to the route, and the plural surfaces 1547A, 1547B extend in second planar directions that are substantially perpendicular to the first planar directions. In one or more embodiments, the plural surfaces may include one or more mating features and/or components that enable the second vehicle frame assembly to be operably coupled with a portion 1560 of the frame 128 of the hi-rail vehicle 116 (shown in FIG. 17).

In one or more embodiments, one or more components of the upper cross frame assembly of the second vehicle frame assembly (e.g., the first and second panels of the first and second housings, respectively, one or more components of the first guide assembly, one or more components of the second guide assembly, or the like), the second frame bar, the second axle, components coupling the first and second guide wheels to the second axle, or the like, may be manufactured of one or more steel alloys. In one or more embodiments, the components may be manufactured of steel or steel alloys in order to provide a level of rigidity, hardness, stiffness, or the like, of the components relative to the components being manufactured of aluminum, or the like. For example, the one or more components and/or systems may be manufactured of steel, such as to enable the vehicle to carry a heavier load, to withstand a greater number of operational cycles, or the like, relative to the components being manufactured of a softer material, material with a lower hardness and/or stiffness, or the like.

The pocket of the first housing is shaped to receive a third actuator system 1534A, and the pocket of the second housing is shaped to receive a fourth actuator system 1534B. The third and fourth actuator systems may be similar to the first and second actuator systems illustrated in FIGS. 12-14. For example, the third actuator system 1534A includes a third actuator device (hidden from view) that is operably coupled with the first and second panels of the first housing via a pivoting connection. For example, the third actuator device may be permitted to pivot or rotate relative to the first housing. The third actuator device can include a third extension component (not shown) that extends into and moves out of the third actuator device. A free end of the extension component may be operably coupled with the second frame bar via a third linkage component. For example, the free end of the extension component is operably coupled with a first portion of the third linkage component, and the second frame bar is operably coupled with a second portion of the third linkage component. The second portion of the third linkage component may include a passage that is shaped and sized to receive the second frame bar therein. The third linkage component and the third actuator device operably couple the first housing with the second frame bar of the second vehicle frame assembly.

Additionally, the pocket of the second housing is shaped and sized to receive a fourth actuator system 1534B. The fourth actuator system 1534B includes a fourth actuator device 1516B. Like the first, second, and third actuator devices, the fourth actuator device is operably coupled with the first and second panels of the second housing via a pivotable connection.

The fourth actuator device also includes a fourth extension component 1518B that extends into and moves out of the fourth actuator device. A free end of the extension component is operably coupled with the second frame bar via a fourth linkage component 1520B. For example, the free end of the extension component is operably coupled with a first portion 1528B of the fourth linkage component, and the second frame bar is operably coupled with a second portion 1526B of the fourth linkage component. The second portion of the fourth linkage component includes a passage that is shaped and sized to receive the second frame bar therein. The fourth linkage component and the fourth actuator device operably coupled the second housing with the second frame bar of the second vehicle frame assembly. For example, the fourth actuator system extends between the second housing and the second frame bar.

Like the first and second actuator devices, the third and fourth actuator devices may be referred to as third and fourth electric actuator devices. The third and fourth electric actuator devices may be electrically powered, such as by receiving power from another system and/or component of the vehicle system (e.g., via a wired connection, not shown), by receiving power from an energy storage device of the vehicle system (not shown), by receiving power from corresponding third and fourth energy storage devices of the third and fourth actuator systems (not shown), or any combination therein.

In one or more embodiments, the hi-rail vehicle system may require the first, second, third, and fourth electric actuator devices in order to control movement of the steel components of the vehicle frame assemblies. For example, in an alternative embodiment in which at least some of the components of the vehicle frame assemblies are manufactured of aluminum, or a material that is lighter in weight relative to steel, the hi-rail vehicle system may only require one electric actuator device to control movement of the first frame bar, and another electric actuator device to control movement of the second frame bar. Optionally, in one or more embodiments in which at least some or all of the components of the vehicle frame assemblies are manufactured of steel, or a material that is heavier in weight (e.g., weights more) relative to aluminum, the hi-rail vehicle system may require at least two electric actuator devices to control movement of the first frame bar, and at least two other electric actuator devices to control movement of the second frame bar.

In one or more embodiments, the first, second, third, and fourth electric actuator devices may be the same type, make, model, or the like. Optionally, the first and second electric actuator devices may be the same type, make, and/or model, and the third and fourth electric actuator devices may be the same type, make, and/or model, but a type, make, and/or model that is different than the first and second electric actuator devices.

In one or more embodiments, power produced by the third and fourth actuator devices may be combined to control rotational movement of the second frame bar. For example, the third and fourth actuator systems may work together (e.g., in unison) to produce or generate power to push or pull the extension components out of or into the actuator devices that causes the second frame bar to rotate in the first direction of rotation 1250 or the second direction of rotation 1252 about the second axis 1524. In the illustrated embodiment, rotating the second frame bar in the first direction of rotation causes the second axle 1522 to move away from the route 126 and towards the second state 1532 (shown in FIG. 17). Alternatively, rotating the second frame bar in the second direction of rotation 1252 causes the second axle 1522 to move toward the route, and toward the first state 1530 (shown in FIGS. 14 and 15).

In the illustrated embodiments shown in FIGS. 15-17, the extension components of the third and fourth electric actuator devices are in a recessed state while the third and fourth guide wheels 1502, 1504 are in contact with the route. For example, the second vehicle frame assembly may be in the first state 1530 while the third and fourth extension components are recessed into the third and fourth electric actuator devices, respectively. To change the second vehicle frame assembly from the first state 1530 to the second state 1532, the extension components of the third and fourth electric actuator devices may be pushed out of the respective third and fourth electric actuator devices. Pushing the extension components out of the third and fourth electric actuator devices causes the third and fourth linkage components to rotate, and thereby causing the second frame bar to rotate in the first direction of rotation 1250 about the second axis 1524. Rotating the second frame bar in the first direction of rotation moves the second axle (and the third and fourth guide wheels) away from the route.

Alternatively, to change the second vehicle frame assembly from the second state 1532 to the first state 1530, the extension components of the third and fourth electric actuator devices are pulled into the respective third and fourth electric actuator devices, causing the third and fourth linkage components to rotate, and thereby causing the second frame bar to rotate in the second direction of rotation 1252 about the second axis 1524. Rotating the second frame bar in the second direction of rotation moves the second axle (and the third and fourth guide wheels) towards the route.

Optionally, the second vehicle frame assembly may be arranged such that the extension components of the third and fourth electric actuator devices may be pulled in to the respective third and fourth electric actuator devices to move the second frame bar in the first direction of rotation; and the extension components may be pushed out or extend from the actuator devices to move the second frame bar in the second direction of rotation. For example, the third and fourth actuator systems may have an alternative arrangement such that the extension components may be pushed out from the actuator devices to move the second axle towards the route, and the extension components may be pulled into the actuator devices to move the second axle away from the route.

In one or more embodiments, the third and fourth electric actuator devices may be capable of producing an amount of combined power to control the rotational movement of the second frame bar, such as based on the weight of the components of the second vehicle frame assembly. For example, a determined required amount of power may be needed to control rotational movement of the second frame bar, and the third and fourth electric actuator devices may be capable of generating a combined amount of power that meets or exceeds the determined required amount of power. In one or more embodiments, the third and fourth electric actuator devices may be capable of generating the same or substantially the same amount of power, that may be combined to meet and/or exceed the determined required amount of power. For example, the determined required amount of power may be provided substantially equally by the third and fourth electric actuator devices. Alternatively, the determined required amount of power may be provided in unequal amounts and/or quantities by the third and fourth electric actuator devices.

In one or more embodiments, the hi-rail vehicle system may be able to operate as a rail vehicle while the first and second vehicle frame assemblies are in the first states 1230, 1530, respectively. For example, the first and second vehicle frame assemblies are in the first states while the first, second, third, and fourth guide wheels are in contact with the route. Alternatively, the hi-rail vehicle system may be able to operate as a non-rail vehicle while the first and second vehicle frame assemblies are in the second states 1232, 1532, respectively. For example, the first and second vehicle frame assemblies may be in the second states while the first, second, third, and fourth guide wheels are moved away from or separated from the route.

In one or more embodiments, the first, second, third, and fourth actuator devices may include one or more manual override features and/or capabilities. For example, if one of the actuator devices malfunctions, fails to operate correctly, loses power, or the like, an operator of the vehicle system 100 may be able to manually control operation of the one or more actuator devices to manually change the state of the first and/or second vehicle frame assemblies between the first states 1230, 1530 and the second state 1232, 1532, respectively.

Figure 18:
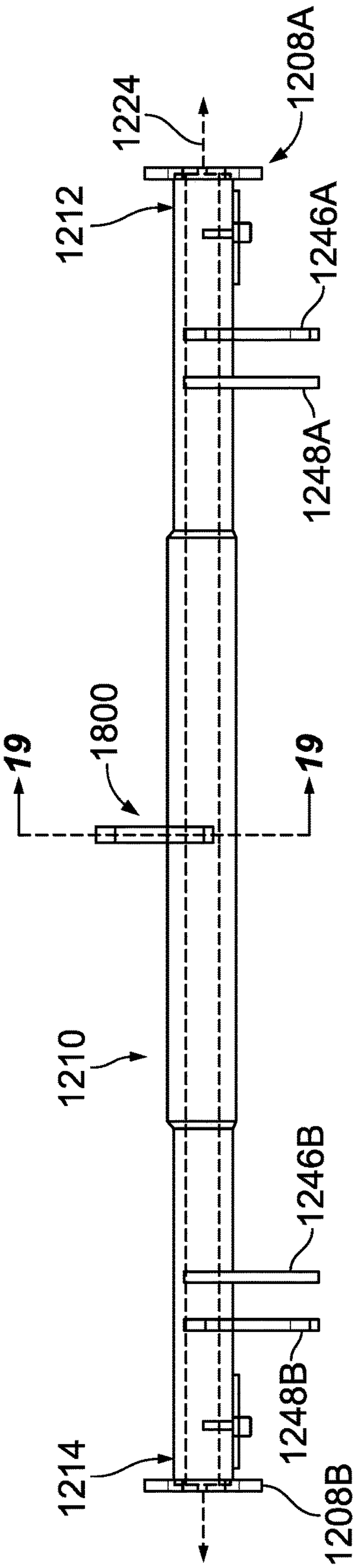
FIG. 18 illustrates a front view of a frame bar of a vehicle frame assembly in accordance with one embodiment.
Figure 19:
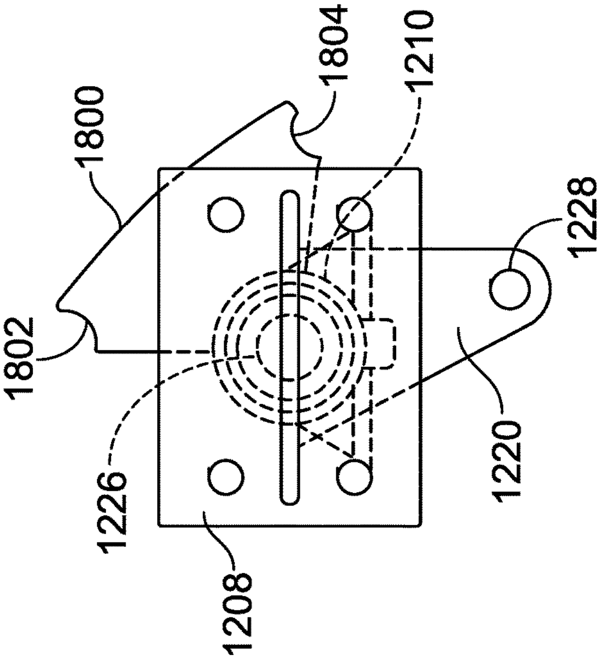
FIG. 19 illustrates a cross-sectional side view of the frame bar illustrated in FIG. 18.

FIG. 18 illustrates a top view of the first frame bar 1210, in accordance with one embodiment. FIG. 19 illustrates a side cross-sectional view of the first frame bar 1210, in accordance with one embodiment. The first frame bar extends between the first end 1212 and the second end 1214 along the first axis 1224. A portion of the first guide assembly 1208A is operably coupled with the first frame bar at the first end 1212, and a portion of the second guide assembly 1208B is operably coupled with the first frame bar at the second end 1214. In the illustrated embodiment, the first and second panels 1246A, 1248A of the first housing are operably coupled with the first frame bar at a first location along the first axis, and the first and second panels 1246B, 1248B of the second housing are operably coupled with the first frame bar at a second location along the first axis.

The first vehicle frame assembly also includes a locking device 1800 that is operably coupled with the first frame bar. In the illustrated embodiment, the locking device is coupled with the first frame bar at a location along the first axis that is substantially centered between the first and second ends of the first frame bar. Optionally, the locking device may be disposed at another location along the first frame bar. In one or more embodiments, the first vehicle frame assembly may include two or more locking devices.

In the illustrated embodiment, the locking device is configured to rotate about the first axis 1224 based on the rotation of the first frame bar in the first and second directions of rotation. For example, the locking device may be referred to as a locking cam, or the like. The locking device includes a first locking feature 1802 and a second locking feature 1804. In the illustrated embodiment, the first and second locking features have a substantially circular cross-sectional shape and extend into the locking device, such as a divot, a recess, a concave feature, or the like. The first and second locking features may be shaped, sized, and positioned to engage with a corresponding locking component of the first vehicle frame assembly (not shown). For example, the first locking feature may be engaged with the corresponding locking component or the second locking feature may be engaged with the corresponding locking component. Engagement of the first or second locking features with the corresponding locking component may hold or maintain a position (e.g., maintain a rotational position) of the axle 1222 in the first state 1230 or in the second state 1232.

In one or more embodiments, the second vehicle frame assembly may include a locking device 1900 (shown in FIG. 15) that is operably coupled with the second frame bar 1510. The locking device 1800 of the first vehicle frame assembly may be substantially the same (e.g., same shape, size, features, material, or the like) as the locking device 1900 of the second vehicle frame assembly. Alternatively, the locking devices may have different shapes, sizes, features, be manufactured of different materials, or the like. In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to minor the predicted best outcome scenario. Additionally, the success metric may be a combination of the optimized outcomes, which may be weighed relative to each other.

In one or more embodiments, a vehicle frame system includes a lower cross frame assembly that is coupled with an axle and includes a frame bar extending between a first end and a second end along a first axis. The frame bar includes a first external circumferential surface extending along at least a portion of the first axis. A first sleeve is configured to be disposed over the first external circumferential surface. A first internal surface of the first sleeve is operably coupled with the first external circumferential surface of the frame bar. The first sleeve is configured for a temperature of the first sleeve to be controlled to change one or more characteristics of the first sleeve. The first sleeve is prohibited from moving relative to the frame bar responsive to changing the one or more characteristics of the first sleeve.

In another aspect, a part (e.g., the first sleeve) may be configured for a temperature of the part to be controlled to change one or more characteristics of the part, in that changing the temperature of the part from a first temperature to a different, second temperature causes one or more dimensions of the part to change, which allows the part to be assembled to another part, and when the temperature of the part is changed from the second temperature to the first temperature the one or more dimensions transition back towards, but not necessarily reaching, their previous state before the temperature was changed from the first temperature to the second temperature, to cause an interference fit between the part and the other part.

Optionally, the vehicle frame system may include a guide assembly operably coupled with the lower cross frame assembly. The guide assembly may include a guide tube extending between a first end and a second end along a second axis, and a second sleeve disposed within a portion of the guide tube. The second sleeve is configured for a temperature of the second sleeve to be controlled to change one or more characteristics of the second sleeve. The second sleeve is prohibited from moving relative to the guide tube responsive to changing the one or more characteristics of the second sleeve. Optionally, the guide assembly is a first guide assembly, and the vehicle frame system may include a second guide assembly. The first guide assembly is operably coupled with the first end of the frame bar of the lower cross frame assembly, and the second guide assembly is operably coupled with the second end of the frame bar of the lower cross frame assembly. Optionally, the lower cross frame assembly may include a first end plate disposed at the first end of the frame bar and a second end plate disposed at the second end of the frame bar. The first end plate is operably coupled with the first guide assembly and the first end of the frame bar, and the second end plate is operably coupled with the second guide assembly and the second end of the frame bar. Optionally, the first end plate and the second end plate are manufactured of an aluminum alloy. Optionally, the frame bar may be manufactured of an aluminum alloy, and the first sleeve may be manufactured of a steel alloy. Optionally, the vehicle frame system may include an actuator device operably coupled with the lower cross frame assembly. The actuator device may control movement of the axle between different states of the axle relative to the lower cross frame assembly. Optionally, the vehicle frame system may be disposed onboard a hybrid vehicle system that is configured to operate as a rail vehicle responsive to the axle being in a first state of the different states, and the hybrid vehicle may operate as a non-rail vehicle responsive to the axle being in a second state of the different states. Optionally, the actuator device may be a linear actuator device or a hydraulic cylinder actuator device. Optionally, the axle may be manufactured of an aluminum alloy. Optionally, the axle may be operably coupled with a first guide wheel disposed at the first end of the axle, and a second guide wheel disposed at the second end of the axle. Optionally, the vehicle frame system may include one or more springs disposed between the frame bar of the lower cross frame assembly and the axle. The one or more springs may allow movement of the axle relative to the frame bar of the lower cross frame assembly.

In one or more embodiments, a vehicle frame system includes an axle extending between a first end and a second end, a first guide wheel operably coupled with the first end of the axle, and a second guide wheel operably coupled with the second end of the axle. A lower cross frame assembly is operably coupled with the axle and includes a frame bar extending between a first end and a second end of the frame bar along a first axis. A first sleeve and a second sleeve are respectively disposed over the first end and the second end of the frame bar. A first guide assembly is operably coupled with the first end of the frame bar and a second guide assembly is operably coupled with the second end of the frame bar. Each of the first and second guide assemblies respectively comprising a guide tube extending between a first end and a second end along a second axis, and a third sleeve disposed within a portion of the guide tube. The first and second sleeves are interference fit with the frame bar and the third sleeve is interference fit within the guide tube so that the first and second sleeves are prohibited from moving relative to the frame bar and the third sleeve is prohibited from moving relative to the guide tube.

Optionally, the interference fit of the first and second sleeves with the frame bar and the interference fit of the third sleeve within the guide tube are each a temperature shrink fit. Optionally, the axle, the frame bar, and the guide tubes of the first and second guide assemblies may be manufactured of an aluminum alloy, and the first, second, and third sleeves may be manufactured of a steel alloy. Optionally, the vehicle frame system may include an actuator device operably coupled with the lower cross frame assembly, and may control movement of the axle between different states of the axle relative to the lower cross frame assembly. Optionally, the vehicle frame system may be disposed onboard a hybrid vehicle system configured to operate as a rail vehicle responsive to the axle being in a first state of the different states, and configured to operate as a non-rail vehicle responsive to the axle being in a second state of the different states. Optionally, the actuator device may be a linear actuator device or a hydraulic cylinder actuator device. Optionally, the vehicle frame system may include plural springs disposed between the frame bar of the lower cross frame assembly and the axle. The plural springs may allow movement of the axle relative to the frame bar of the lower cross frame assembly in a direction toward the frame bar or in a direction away from the frame bar.

In one or more embodiments, a railgear for a hi-rail vehicle includes an axle extending between a first end and a second end. A first guide wheel is operably coupled with the first end of the axle, and a second guide wheel is operably coupled with the second end of the axle. A lower cross frame assembly is operably coupled with the axle and include a frame bar extending between a first end and a second end along a first axis. A first sleeve is disposed over the first end of the frame bar and a second sleeve is disposed over the second end of the frame bar. An actuator device is operably coupled with the lower cross frame assembly and controls movement of the axle between different states of the axle relative to the lower cross frame assembly. The railgear includes first and second guide assemblies operably coupled with the first and second ends of the frame bar. Each of the first and second guide assemblies respectively comprising a guide tube extending between a first end and a second end along a second axis, and a third sleeve disposed within a portion of the guide tube. The first sleeve and the second sleeve are interference fit on to the first and second ends of the frame bar, respectively, and the third sleeve of each of the first and second guide assemblies is interference fit within the guide tube, so that the first and second sleeves and the third sleeve are prohibited from moving relative to the frame bar and the guide tube, respectively.

Optionally, the interference fit between the first and second sleeves and the frame bar, and the interference fit of the third sleeve within the guide tube are each a temperature shrink fit. Optionally, the axle, the frame bar, and the guide tubes of the first and second guide assemblies may be manufactured of an aluminum alloy, and the first, second, and third sleeves may be manufactured of a steel alloy. Optionally, a hi-rail vehicle may include the railgear, and the hi-rail vehicle may operate as a rail vehicle responsive to the axle being in a first state of the different states, and the hi-rail vehicle system may operate as a non-rail vehicle responsive to the axle being in the second state of the different states.

In accordance with one example or aspect, a vehicle frame assembly includes a frame bar extending between a first end and a second end along a first axis. The first end of the frame bar is operably coupled with a first guide assembly extending between the first end of the frame bar and a third end of an axle, and the second end of the frame bar is operably coupled with a second guide assembly extending between the second end of the frame bar and a fourth end of the axle. A first housing is operably coupled with a frame of a vehicle system, and a second housing is operably coupled with the frame of the vehicle system. A first actuator system is operably coupled with and extends between the first housing and the frame bar at a first location of the frame bar along the first axis, and a second actuator system is operably coupled with and extends between the second housing and the frame bar at a second location of the frame bar along the first axis. The first actuator system and the second actuator system control rotational movement of the frame bar between a first direction of rotation and a second direction of rotation. Rotating the frame bar in the first direction of rotation moves the axle away from a route along which the vehicle system is configured to move, and rotating the frame bar in the second direction of rotation moves the axle toward the route.

Optionally, the frame bar, the axle, the first housing, the second housing, the first guide assembly, and the second guide assembly may be manufactured of one or more steel alloys. Optionally, the vehicle frame assembly may include a first guide wheel disposed at the third end of the axle and a second guide wheel disposed at the fourth end of the axle. The first and second actuator systems may rotate the frame bar in the first direction of rotation to move the first and second guide wheels away from the route, and the first and second actuator systems may rotate the frame bar in the second direction of rotation to move the first and second guide wheels toward the route. Optionally, the first actuator system may include a first electric actuator device and the second actuator system may include a second electric actuator device. Optionally, the first electric actuator device may include a first energy storage device that provides power to the first electric actuator device, and the second electric actuator device may include a second energy storage device that provides power to the second electric actuator device. Optionally, the first and second electric actuator devices may receive power from the vehicle system. Optionally, the first actuator system may include the first electric actuator device including a first extension component and a first linkage component. Optionally, a first portion of the first linkage component may be operably coupled with the first extension component and a second portion of the first linkage component may be operably coupled with the frame bar. Optionally, the second actuator system may include the second electric actuator device including a second extension component and a second linkage component. Optionally, a first portion of the second linkage component may be operably coupled with the second extension component and a second portion of the second linkage component may be operably coupled with the frame bar. Optionally, the vehicle frame assembly may include a locking device that may be operably coupled with the frame bar. The locking device may maintain a rotational position of the frame bar.

In accordance with one example or aspect, a hi-rail vehicle system includes a hi-rail vehicle having a frame extending between a first end and a second end. The hi-rail vehicle system includes a first vehicle frame assembly operably coupled with the frame proximate the first end of the frame. The first vehicle frame assembly includes a first frame bar that extends between a third end and a fourth end along a first axis. The first vehicle frame assembly includes first and second actuator systems operably coupled with the first frame bar and control rotational movement of the first frame bar. The hi-rail vehicle system also includes a second vehicle frame assembly that is operably coupled with the frame of the hi-rail vehicle proximate the second end of the frame. The second vehicle frame assembly includes a second frame bar that extends between a fifth end and a sixth end along a second axis. The second vehicle frame assembly includes third and fourth actuator systems that are operably coupled with the second frame bar and control rotational movement of the second frame bar. The first and second actuator systems rotate the first frame bar in a first direction of rotation or a second direction of rotation to change a state of a first axle operably coupled with the first frame bar, and the third and fourth actuator systems rotate the second frame bar in the first direction of rotation or the second direction of rotation to change a state of a second axle operably coupled with the second frame bar.

Optionally, the first vehicle frame assembly may include a first housing that is operably coupled with the frame of the hi-rail vehicle and the first actuator system, and a second housing that is operably coupled with the frame of the hi-rail vehicle and the second actuator system. The second vehicle frame assembly may include a third housing that is operably coupled with the frame of the hi-rail vehicle and the third actuator system, and a fourth housing that is operably coupled with the frame of the hi-rail vehicle and the fourth actuator system. Optionally, the first housing may be operably coupled with the first frame bar via the first actuator system, and the second housing may be operably coupled with the first frame bar via the second actuator system. Optionally, the third housing may be operably coupled with the second frame bar via the third actuator system, and the fourth housing may be operably coupled with the second frame bar via the fourth actuator system. Optionally, the first frame bar, the first axle, the first housing, the second housing, the second frame bar, the second axle, the third housing, and the fourth housing may be manufactured of one or more steel alloys. Optionally, the first actuator system may include a first electric actuator device, the second actuator system may include a second electric actuator device, the third actuator system may include a third electric actuator device, and the fourth actuator system may include a fourth electric actuator device. Optionally, the first, second, third, and fourth electric actuator devices may receive power from the hi-rail vehicle. Optionally, the hi-rail vehicle may operate as a non-rail vehicle responsive to the first frame bar and the second frame bar rotating in the first direction of rotation, and the hi-rail vehicle may operate as a rail vehicle responsive to the first frame bar and the second frame bar rotating in the second direction of rotation.

In accordance with one example or aspect, a rail-gear for a hi-rail vehicle includes a frame bar extending between a first end and a second end along a first axis. The first end of the frame bar is operably coupled with the first guide assembly extending between the first end of the frame bar and a third end of an axle. The second end of the frame bar is operably coupled with a second guide assembly extending between the second end of the frame bar and a fourth end of the axle. A first housing is operably coupled with a frame of a hi rail vehicle, and a first electric actuator system is operably coupled with the first housing and the frame bar. A second housing is operably coupled with the frame of the hi-rail vehicle and a second electric actuator system is operably coupled with the second housing and the frame bar. The first and second electric actuator systems receive electric power from the hi-rail vehicle. The first and second electric actuator systems control rotational movement of the frame bar between a first direction of rotation and a second direction of rotation about the first axis. Rotating the frame bar in the first direction of rotation moves the axle away from a route along which the hi-rail vehicle is configured to move, and rotating the frame bar in the second direction of rotation moves the axle toward the route.

In accordance with one example or aspect, a vehicle frame assembly includes a frame bar extending between a first end and a second end along a first axis. The first end of the frame bar is operably coupled with a first guide assembly extending between the first end of the frame bar and a third end of an axle. The second end of the frame bar is operably coupled with a second guide assembly extending between the second end of the frame bar and a fourth end of the axle. A first housing is operably coupled with a frame of a vehicle system, and a second housing is operably coupled with the frame of the vehicle system A first actuator system is operably coupled with and extends between the first housing and the frame bar at a first location of the frame bar along the first axis, and a second actuator system is operably coupled with and extends between the second housing and the frame bar at a second location of the frame bar along the first axis. The first actuator system and the second actuator system control rotational movement of the frame bar between a first direction of rotation and a second direction of rotation. Rotating the frame bar in the first direction of rotation moves the axle away from a route along which the vehicle system moves, and rotating the frame bar in the second direction of rotation moves the axle towards the route.

Optionally, the frame bar, the axle, the first housing, the second housing, the first guide assembly, and the second guide assembly are manufactured of one or more steel alloys. Optionally, the assembly may include a first guide wheel disposed at a third end of the axle and a second guide wheel disposed at the fourth end of the axle. The first and second actuator systems may rotate the frame bar in the first direction of rotation to move the first and second guide wheels away from the route, and may rotate the frame bar in the second direction of rotation to move the first and second guide wheels toward the route. Optionally, the first actuator system may include a first electric actuator device, and the second actuator system may include a second electric actuator device. Optionally, the first electric actuator device may include a first energy storage device configured to provide power to the first electric actuator device, and the second electric actuator device may include a second energy storage device configured to provide power to the second electric actuator device. Optionally, the first and second electric actuator devices may receive power from the vehicle system. Optionally, the first actuator system may include the first electric actuator device that includes a first extension component, and a first linkage component. Optionally, a first portion of the first linkage component may be coupled with the first extension component, and a second portion of the first linkage component may be coupled with the frame bar. Optionally, the second actuator system may include the second electric actuator device including a second extension component and a second linkage component. Optionally, a first portion of the second linkage component may be coupled with the second extension component and a second portion of the second linkage component may be coupled with the frame bar. Optionally, a locking device may be coupled with the frame bar. The locking device may maintain a rotational position of the frame bar.

In accordance with one example or aspect, a hi-rail vehicle system includes a hi-rail vehicle that includes a frame extending between a first end and a second end. A first vehicle frame assembly is operably coupled with the frame of the hi-rail vehicle proximate the first end of the frame. The first vehicle frame assembly includes a first frame bar extending between a third end and a fourth end along a first axis. The first vehicle frame assembly includes first and second actuator systems configured to be operably coupled with the first frame bar and control rotational movement of the first frame bar. A second vehicle frame assembly is operably coupled with the frame of the hi-rail vehicle proximate the second end of the frame. The second vehicle frame assembly includes a second frame bar extending between a fifth end and a sixth end along a second axis. The second vehicle frame assembly includes third and fourth actuator systems that are operably coupled with the second frame bar and control rotational movement of the second frame bar. The first and second actuator systems rotate the first frame bar in a first direction of rotation or a second direction of rotation to change a state of a first axle operably coupled with the first frame bar. The third and fourth actuator systems rotate the second frame bar in the first direction of rotation or the second direction of rotation to change a state of a second axle operably coupled with the second frame bar.

Optionally, the first vehicle frame assembly may include a first housing coupled with the frame of the hi-rail vehicle and the first actuator system. A second housing may be coupled with the frame of the hi-rail vehicle and the second actuator system. The second vehicle frame assembly may include a third housing coupled with the frame of the hi-rail vehicle and the third actuator system, and a fourth housing may be coupled with the frame of the hi-rail vehicle and the fourth actuator system. Optionally, the first housing may be operably coupled with the first frame bar via the first actuator system, and the second housing may be operably coupled with the first frame bar via the second actuator system. Optionally, the third housing may be operably coupled with the second frame bar via the third actuator system, and the fourth housing may be operably coupled with the second frame bar via the fourth actuator system. Optionally, the first frame bar, the first axle, the first housing, the second housing, the second frame bar, the second axle, the third housing, and the fourth housing may be manufactured of one or more steel alloys. Optionally, the first actuator system may include a first electric actuator device, the second actuator system may include a second electric actuator device, the third actuator system may include a third electric actuator device, and the fourth actuator system may include a fourth electric actuator device. Optionally, one or more of the first, second, third, and fourth electric actuator devices may receive power from the hi-rail vehicle. Optionally, the hi-rail vehicle may operate as a non-rail vehicle responsive to the first frame bar and the second frame bar rotating in the first direction of rotation, and the hi-rail vehicle may operate as a rail vehicle responsive to the first frame bar and the second frame bar rotating in the second direction of rotation.

In accordance with one example or aspect, a rail-gear for a hi-rail vehicle includes a frame bar extending between a first end and a second end along a first axis. The first end of the frame bar is operably coupled with a first guide assembly extending between the first end of the frame bar and a third end of an axle. The second end of the frame bar is operably coupled with a second guide assembly extending between the second end of the frame bar and a fourth end of the axle. A first housing is operably coupled with a frame of a hi-rail vehicle, and a first electric actuator system is operably coupled with the first housing and the frame bar. A second housing is operably coupled with the frame of the hi-rail vehicle, and a second electric actuator system is operably coupled with the second housing and the frame bar. The first and second electric actuator systems receive electric power from the hi-rail vehicle. The first and second electric actuator systems control rotational movement of the frame bar between a first direction of rotation and a second direction of rotation about the first axis. Rotating the frame bar in the first direction of rotation moves the axle away from a route along which the hi-rail vehicle moves, and rotating the frame bar in the second direction of rotation moves the axle toward the route.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle frame assembly, comprising:

a frame bar extending between a first end and a second end along a first axis, the first end of the frame bar operably coupled with a first guide assembly extending between the first end of the frame bar and a third end of an axle, the second end of the frame bar operably coupled with a second guide assembly extending between the second end of the frame bar and a fourth end of the axle;

a first housing configured to be operably coupled with a frame of a vehicle system;

a second housing configured to be operably coupled with the frame of the vehicle system;

a first actuator system configured to be operably coupled with and extend between the first housing and the frame bar at a first location of the frame bar along the first axis; and a second actuator system configured to be operably coupled with and extend between the second housing and the frame bar at a second location of the frame bar along the first axis, the first actuator system and the second actuator system configured to control rotational movement of the frame bar about the first axis between a first direction of rotation and a second direction of rotation, wherein rotating the frame bar in the first direction of rotation moves the axle away from a route along which the vehicle system is configured to move, and rotating the frame bar in the second direction of rotation moves the axle toward the route.

2. The vehicle frame assembly of claim 1, wherein one or more of the frame bar, the axle, the first housing, the second housing, the first guide assembly, and the second guide assembly are manufactured of one or more steel alloys.

3. The vehicle frame assembly of claim 1, further comprising a first guide wheel disposed at the third end of the axle and a second guide wheel disposed at the fourth end of the axle, wherein the first and second actuator systems are configured to rotate the frame bar in the first direction of rotation to move the first and second guide wheels away from the route, and the first and second actuator systems are configured to rotate the frame bar in the second direction of rotation to move the first and second guide wheels toward the route.

4. The vehicle frame assembly of claim 1, wherein the first actuator system includes a first electric actuator device and the second actuator system includes a second electric actuator device.

5. The vehicle frame assembly of claim 4, wherein the first electric actuator device includes a first energy storage device configured to provide power to the first electric actuator device, and the second electric actuator device includes a second energy storage device configured to provide power to the second electric actuator device.

6. The vehicle frame assembly of claim 4, wherein the first and second electric actuator devices are configured to receive power from the vehicle system.

7. The vehicle frame assembly of claim 4, wherein the first actuator system includes a first linkage component and the first electric actuator device, the first electric actuator device including a first extension component.

8. The vehicle frame assembly of claim 7, wherein a first portion of the first linkage component is configured to be operably coupled with the first extension component, and a second portion of the first linkage component is configured to be operably coupled with the frame bar.

9. The vehicle frame assembly of claim 4, wherein the second actuator system includes a second linkage component and the second electric actuator device, the second electric actuator device including a second extension component.

10. The vehicle frame assembly of claim 9, wherein a first portion of the second linkage component is configured to be operably coupled with the second extension component, and a second portion of the second linkage component is configured to be operably coupled with the frame bar.

11. The vehicle frame assembly of claim 1, further comprising a locking device configured to be operably coupled with the frame bar, the locking device configured to maintain a rotational position of the frame bar.

12. A hi-rail vehicle system, comprising:

a hi-rail vehicle including a frame extending between a first end and a second end;

a first vehicle frame assembly configured to be operably coupled with the frame of the hi-rail vehicle proximate the first end of the frame, the first vehicle frame assembly comprising a first frame bar extending between a third end and a fourth end along a first axis, the first vehicle frame assembly including first and second actuator systems configured to be operably coupled with the first frame bar and configured to control rotational movement of the first frame bar about the first axis; and a second vehicle frame assembly configured to be operably coupled with the frame of the hi-rail vehicle proximate the second end of the frame, the second vehicle frame assembly comprising a second frame bar extending between a fifth end and a sixth end along a second axis, the second vehicle frame assembly including third and fourth actuator systems configured to be operably coupled with the second frame bar and configured to control rotational movement of the second frame bar about the second axis;

the first and second actuator systems configured to rotate the first frame bar about the first axis in a first direction of rotation or a second direction of rotation to change a state of a first axle operably coupled with the first frame bar, the third and fourth actuator systems configured to rotate the second frame bar about the second axis in the first direction of rotation or the second direction of rotation to change a state of a second axle operably coupled with the second frame bar.

13. The hi-rail vehicle system of claim 12, the first vehicle frame assembly further comprising a first housing configured to be operably coupled with the frame of the hi-rail vehicle and the first actuator system, and a second housing configured to be operably coupled with the frame of the hi-rail vehicle and the second actuator system, the second vehicle frame assembly further comprising a third housing configured to be operably coupled with the frame of the hi-rail vehicle and the third actuator system, and a fourth housing configured to be operably coupled with the frame of the hi-rail vehicle and the fourth actuator system.

14. The hi-rail vehicle system of claim 13, wherein the first housing is configured to be operably coupled with the first frame bar via the first actuator system, and the second housing is configured to be operably coupled with the first frame bar via the second actuator system.

15. The hi-rail vehicle system of claim 13, wherein the third housing is configured to be operably coupled with the second frame bar via the third actuator system, and the fourth housing is configured to be operably coupled with the second frame bar via the fourth actuator system.

16. The hi-rail vehicle system of claim 13, wherein one or more of the first frame bar, the first axle, the first housing, the second housing, the second frame bar, the second axle, the third housing, and the fourth housing are manufactured of one or more steel alloys.

17. The hi-rail vehicle system of claim 12, wherein the first actuator system includes a first electric actuator device, the second actuator system includes a second electric actuator device, the third actuator system includes a third electric actuator device, and the fourth actuator system includes a fourth electric actuator device.

18. The hi-rail vehicle system of claim 17, wherein one or more of the first, second, third, and fourth electric actuator devices are configured to receive power from the hi-rail vehicle.

19. The hi-rail vehicle system of claim 12, wherein the hi-rail vehicle is configured to operate as a non-rail vehicle responsive to the first frame bar and the second frame bar rotating in the first direction of rotation, and the hi-rail vehicle is configured to operate as a rail vehicle responsive to the first frame bar and the second frame bar rotating in the second direction of rotation.

20. A rail-gear for a hi-rail vehicle, comprising:

a frame bar extending between a first end and a second end along a first axis, the first end of the frame bar configured to be operably coupled with a first guide assembly extending between the first end of the frame bar and a third end of an axle, the second end of the frame bar configured to be operably coupled with a second guide assembly extending between the second end of the frame bar and a fourth end of the axle;

a first housing configured to be operably coupled with a frame of a hi-rail vehicle;

a first electric actuator system configured to be operably coupled with the first housing and the frame bar;

a second housing configured to be operably coupled with the frame of the hi-rail vehicle; and a second electric actuator system configured to be operably coupled with the second housing and the frame bar, the first and second electric actuator systems configured to receive electric power from the hi-rail vehicle, and the first and second electric actuator systems configured to control rotational movement of the frame bar about the first axis between a first direction of rotation and a second direction of rotation about the first axis, wherein rotating the frame bar in the first direction of rotation pivots the first guide assembly and the second guide about the first axis and moves the axle away from a route along which the hi-rail vehicle is configured to move, and rotating the frame bar in the second direction of rotation pivots the first guide assembly and the second guide about the first axis and moves the axle toward the route.

* * * * *